US011770404B2

(12) United States Patent
McNee et al.

(10) Patent No.: US 11,770,404 B2
(45) Date of Patent: Sep. 26, 2023

(54) ENHANCED NEUTRAL DOMAIN DATA SELECTION FOR CYBERSECURITY MACHINE LEARNING APPLICATIONS

(71) Applicant: DomainTools, LLC, Seattle, WA (US)

(72) Inventors: Sean M. McNee, Seattle, WA (US);
John W. Conwell, Tukwila, WA (US)

(73) Assignee: Domain Tools, LLC, Seattle, WA (US)

( * ) Notice: Subject to any disclaimer, the term of this patent is extended or adjusted under 35 U.S.C. 154(b) by 466 days.

(21) Appl. No.: 17/094,800

(22) Filed: Nov. 10, 2020

(65) Prior Publication Data
US 2022/0150275 A1 May 12, 2022

(51) Int. Cl.
*H04L 9/40* (2022.01)
*G06N 20/00* (2019.01)
*G06N 5/04* (2023.01)
G06Q 30/0204 (2023.01)
G06Q 30/018 (2023.01)
G06Q 10/0635 (2023.01)

(52) U.S. Cl.
CPC .......... *H04L 63/1441* (2013.01); *G06N 5/04* (2013.01); *G06N 20/00* (2019.01); *G06Q 10/0635* (2013.01); *G06Q 30/0185* (2013.01); *G06Q 30/0205* (2013.01)

(58) Field of Classification Search
CPC ............ H04L 63/1441; G06Q 10/0635; G06Q 30/0185; G06Q 30/0205; G06N 5/04; G06N 20/00
See application file for complete search history.

(56) References Cited

U.S. PATENT DOCUMENTS

2012/0158626 A1 6/2012 Zhu et al.
2016/0269362 A1* 9/2016 Rolette .................. H04L 63/20
(Continued)

OTHER PUBLICATIONS

International Search Report and Written Opinion issued in PCT Application No. PCT/US2021/057784, international filing date Nov. 2, 2021, dated Feb. 3, 2022.
(Continued)

*Primary Examiner* — Matthew T Henning
(74) *Attorney, Agent, or Firm* — Lowe Graham Jones PLLC; Ellen M. Bierman

(57) ABSTRACT

Methods, systems, and techniques for producing and using enhanced machine learning models and computer-implemented tools to investigate cybersecurity related data and threat intelligence data are provided. Example embodiments provide an Enhanced Predictive Security System, for building, deploying, and managing applications for evaluating threat intelligence data that can predict malicious domains associated with bad actors before the domains are known to be malicious. In one example, the EPSS comprises one or more components that work together to provide an architecture and a framework for building and deploying cybersecurity threat analysis application, including machine learning algorithms, feature class engines, tuning systems, ensemble classifier engines, and validation and testing engines. These components cooperate and act upon domain data and feature class vectors to create sampled test, training, and validation data and to build model subsets and applications using a trained model library, which stores definitions of each model subset for easy re-instantiation.

22 Claims, 14 Drawing Sheets

(56) References Cited

U.S. PATENT DOCUMENTS

2017/0099314 A1   4/2017   Klatt et al.
2018/0351972 A1*  12/2018  Yu ...................... H04L 63/1416
2020/0349430 A1   11/2020  Schmidtler et al.

OTHER PUBLICATIONS

Acohido, Byron, "DNS Forensics: Where Intuition Meets Experience," DomainTools, 2017, 10 pages.
Koren, Yehuda, "The BellKor Solution to the Netflix Grand Prize," Aug. 2009, 10 pages.
"Leveraging Risk Scoring for Threat Hunting: DomainTools Risk Score," DomainTools, retrieved from the Internet at https://www.domaintools.com/resources/blog/leveraging-risk-scoring-for-threat-hunting-domaintools-risk-score on May 31, 2020, 2 pages.
Parikh, Jugal et al., "Protecting the Protector, Hardening Machine Learning Defenses Against Adversarial Attacks," Black Hat USA, Las Vegas, Nevada, Aug. 9, 2018, 2 pages.
Parikh, Jugal et al., "Protecting the Protector: Hardening Machine Learning Defenses Against Adversarial Attacks," Microsoft, 2018, 68 pages.
Piotte, Martin et al., "The Pragmatic Theory solution to the Netflix Grand Prize," Pragmatic Theory Inc., Canada, Aug. 2009, pp. 1-92.
Smith, Randy F. et al., "Detecting Malicious Domains Using Artificial Intelligence and Machine Learning," DomainTools, 2019, 7 pages.
Stokes, Jack W. et al., "Attack and Defense of Dynamic Analysis-Based, Adversarial Neural Malware Classification Models," arXiv. 1712.05919v1 [cs.CR], Dec. 16, 2017, 12 pages.
"The new 'Hotness' at DomainTools, Introducing Domain Hotlist," DomainTools, retrieved from the Internet at https://www.domaintools.com/resources/blog/the-new-hotness-at-domaintools-introducing-domain-hotlist on May 31, 2020, 2 pages.
"Threat Intelligence Playbook: Making Sense of Indicators," DomainTools, 2018, 6 pages.
Toescher, Andreas et al., "The BigChaos, Solution to the Netflix Grand Prize," Commendo Research & Consulting, Koeflach, Austria; AT&T Labs—Research, Florham Park, New Jersey; Sep. 5, 2009; 52 pages.
Treit, Randy, "Detonating a bad rabbit: Windows Defender Antivirus and layered machine learning defenses," Microsoft, retrieved from the Internet at https://www.microsoft.com/security/blog/2017/12/11/detonating-a-bad-rabbit-windows-defender-antivirus-and-layered-machine-learning-defenses/ on Jun. 16, 2020, 7 pages.
Treit, Randy et al., "Protecting the protector: Hardening machine learning defenses against adversarial attacks," Microsoft, retrieved from the Internet at https://www.microsoft.com/security/blog/2018/08/09/protecting-the-protector-hardening-machine-learning-defenses-against-adversarial-attacks/ on Jun. 16, 2020, 16 pages.
"What is Cybersecurity Forensics?," DomainTools, retrieved from the Internet at https://www.domaintools.com/resources/blog/what-is-cybersecurity-forensics on May 31, 2020, 2 pages.

* cited by examiner

Domain Table 500

| DOMAIN NAME 501 | IP ADDRESS 502 | DNS "A" Record or other "zone data" 503 | ... 504 | STATUS 505 | Scores 506 | TLS CERT INFO 507 | WHOIS data 508 | Host-name data 509 | pDNS activity data 510 |
|---|---|---|---|---|---|---|---|---|---|
| domaintools.com (501a) | 88.501.74.3 | 502a... | ... | KN | 0/0/0 | ... | ... | ... | ... |
| d00maint00lz.com (501b) | 49.550.50.3 | 502b... | ... | KM | 99/4/5 | ... | ... | ... | ... |
| test.domaintools.com (501c) | 88.501.74.3 | 502c... | ... | KN | 0 | ... | ... | ... | ... |
| ... (501d) | ... | ... | ... | ... | ... | ... | ... | ... | ... |
| acmebank.com (501e) | ... | ... | ... | ... | 44 | ... | ... | ... | ... |
| acmebank.org (501f) | ... | ... | ... | ... | ... | ... | ... | ... | ... |
| ... (501g) | ... | ... | ... | ... | ... | ... | ... | ... | ... |

*Fig. 5*

ENHANCED NEUTRAL DOMAIN DATA SELECTION FOR CYBERSECURITY MACHINE LEARNING APPLICATIONS

TECHNICAL FIELD

The present disclosure relates to methods, techniques, and systems for machine learning applications related to cybersecurity and, in particular, to methods, techniques, and systems for producing and using enhanced machine learning models and computer-implemented tools for investigating cybersecurity related data and threat intelligence data.

BACKGROUND

With the proliferation and connectivity of computers, electronic devices, and smart appliances in many aspects of everyday life also comes concerns for keeping these systems and devices free from cyberattacks, malicious use, and otherwise unauthorized and unwarranted interference, whether for criminal or other fraudulent purposes. Cybersecurity threats of many different types have unfortunately become a daily concern for many and it is nearly impossible to track and alleviate all of them before sustaining some damage. Corporations and large organizations often employ dedicated security analysts charged with keeping current in an ever changing landscape.

Cybersecurity threats (cyber threats) typically fall into several categories and often begin with spam and phishing assaults which are geared to luring and manipulating target recipients (victims) into divulging confidential information for fraudulent use. Phishing typically involves use of a fraudulent email or communication which appears as though it originates from a trusted sender. The victim is then lured into providing on a scam website or via malware (malicious software) downloaded onto the victim's device, often via a link or an attachment, the confidential information, for example, email information, online banking details, passwords, social network information, and the like. Such confidential information may be used by a cybercriminal (or other bad actor generally), for example, to access the victim's financial accounts to steal the victim's money or identity or to conduct banking or credit card fraud. Spam typically presents itself as an advertisement email often of fake or phony products configured to obtain confidential information or cause a download of malware for example by luring the recipient to open a link or attached file. The malware may collect confidential information which is forwarded to cybercriminals or may cause other malfunctions on the device.

Different approaches have been employed by various organizations and software providers to reduce the number of and severity of cybersecurity incidents, including, upon detection and identification of a cyber threat, mitigating the spread of the attack using blocklists, firewall security, running malware detection and removal software, etc. These approaches operate by prohibiting known "bad actor" domains and malware from accessing a device. Unfortunately, by the time the cyber threat is detected, the bad actor has already done some damage because this approach is fundamentally tied to the notion that a cybersecurity breach already has occurred and, from that perspective, is a reactive assessment.

Some organizations employ security analysts to determine prospectively whether code, a domain, an email, etc. is likely to be malicious. The data and analysis collected by such organizations is often known as "threat intelligence" and is used to gain valuable knowledge to make informed cyber security decisions. Threat intelligence also allows such organizations to build more effective defense mechanisms and to mitigate risks that could damage the organization's reputation and/or bottom line. A difficulty encountered is that the characterizations of security vulnerabilities, the attack vectors (mechanisms used to attack), and the profiles of bad actors are constantly changing and it has become very difficult if not impossible for human security analysts to timely address all security vulnerabilities before or after incidences occur.

BRIEF DESCRIPTION OF THE DRAWINGS

FIG. 5 is a block diagram of an example domain table built, managed, and used by an example Enhanced Predictive Security System.

DETAILED DESCRIPTION

Figure 1:
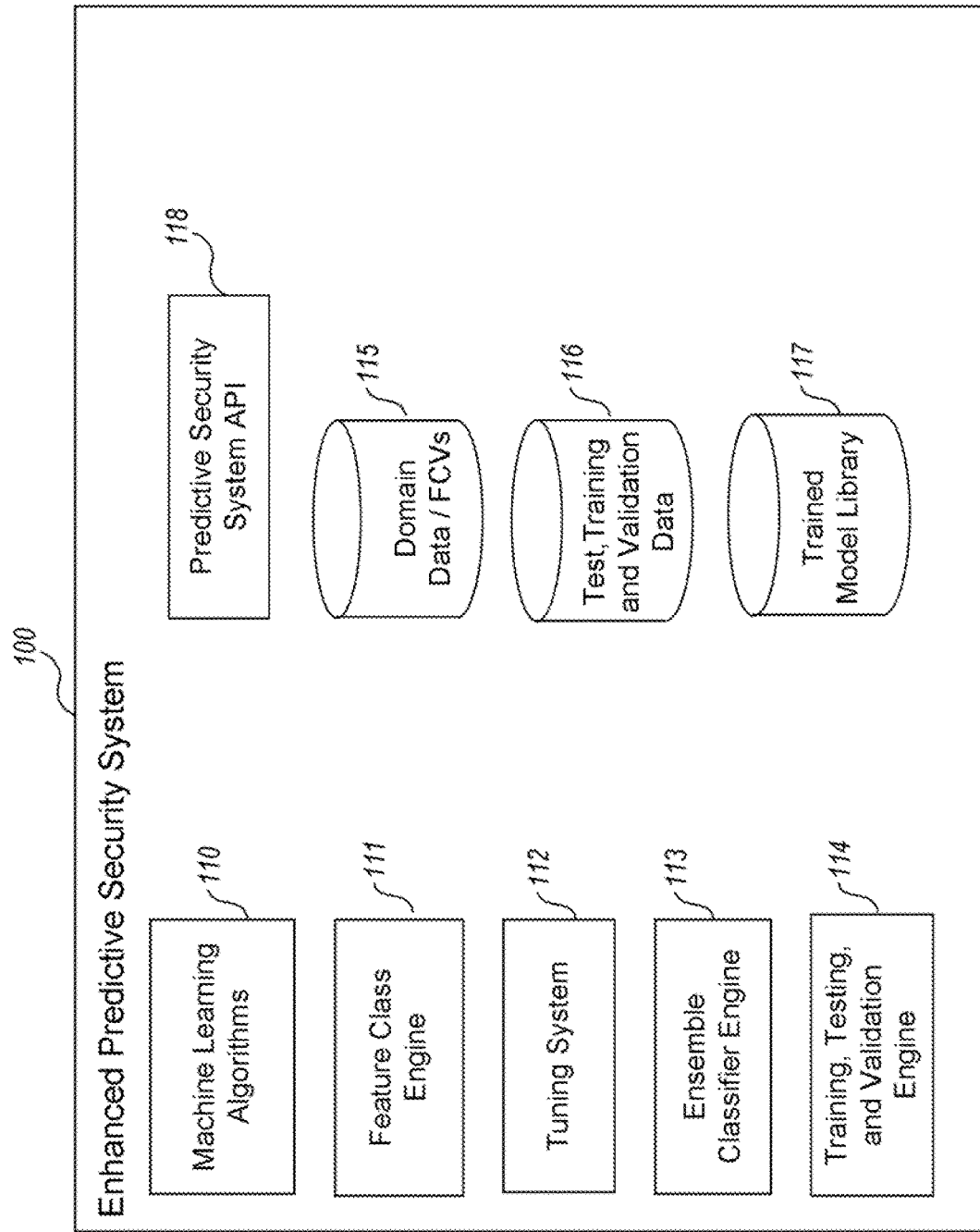
FIG. 1 is a block diagram of components of an example Enhanced Predictive Security System described herein.

Embodiments described herein provide enhanced computer- and network-based methods, techniques, and systems for producing and using enhanced machine learning models and computer-implemented tools to investigate cybersecurity related data and threat intelligence data. Example embodiments provide an Enhanced Predictive Security System ("EPSS"), which enables security software application and platform providers to build, deploy, and manage applications for evaluating threat intelligence data that can predict malicious domains associated with bad actors before they are known to be malicious. That is, these applications can be used to determine "predictably malicious" domains before these domains become problematic. The EPSS and the applications built therefrom provide a domain centric approach to security which can be run by end users, for example, security analysts and other cyber threat investigators, to collect and investigate threat intelligence data prospectively and not just reactively.

In one powerful incarnation, in overview the EPSS uses a domain centric approach combined with advanced machine learning algorithms and a multi-level machine learning architecture that utilizes one or more subsets of the smaller models trained with different data, whose results are combined as input to an (at least one) ensemble master classifier, which can be ultimately tuned and optimized for the type of data it is responsible for classifying. Each subset of the smaller models includes multiple instances of a same model sharing a same machine learning algorithm, modeling tuning parameters, and feature vector values but trained using different trained data. Hence each model subset acts as a set of "weak classifiers" for a particular type or collection of threat data. Certain subsets may be more applicable and tuned for certain types of applications because they pull (access, assess, determine, etc.) different domain related data, or are tuned differently, etc. A combination of the results of each applicable subset of weak classifiers then is fed as input into the ensemble master classifier, which can be iteratively run with varying weights applied to the weak classifier subset outputs until a determined optimization value (e.g., a threshold, minimum, percentage, probability, etc.) is reached. The resultant ensemble master classifier can then be deployed as a cybersecurity threat analysis application applied to an unknown domain to predict whether it is "predictably malicious."

Other incarnations of the EPSS combine one or more aspects of these features to generate different types of cybersecurity threat analysis applications that are targeted to different types of security threats or different audiences of end users. For example, the capabilities of an example EPSS may be used to create separate or combined deployable applications for phishing, spam, or malware, and/or targeted for different vertical customer markets (e.g., government, educational, transportation, etc.) controlled by the selection of different feature classes used to select and transform different domain related data into feature vectors for the different model subsets, tuning parameters, and machine learning algorithms. The EPSS stores the metadata used to create these different models in a model library for easier "plug and plug" experimentation to create these differing applications so that a model subset can be easily regenerated or used as a template to create new ones. Accordingly, the EPSS also provides an architecture for building new cybersecurity threat analysis applications in an easily repeatable and consistent fashion that is extensible for providing new applications and that doesn't rely on human recall of experimentation results. The EPSS can thus be employed to empower faster (more efficient) and repeatable security application generation.

Although some machine learning solutions are currently employed to perform proactive assessment, they are limited in scope and do not offer a plug and play architecture for formulating new applications or quickly modifying existing security models and/or tuning them over time. For example, currently DomainTools offers several separate tools for investigating cybersecurity threats, including a tool for each of spam, malware, and phishing, that uses a single separate (single level) machine learning classifier to predict whether a domain is malicious based upon the unknown domain's similarity to domains already known to be malicious. Also, Microsoft is developing a tool for using machine learning to analyze whether code is likely to constitute malware by predicting its similarity to known malware. None of these tools provide architectures and frameworks for easily building new cybersecurity threat analysis applications and none of these tools use potentially three levels of machine learning to improve the accuracy and reliability of predictions of malicious domains.

In addition, the EPSS embodies a new mechanism and framework for obtaining improved neutral data sets of domains for use in the training, testing, and validation of threat analysis models for cybersecurity applications. In overview, neutral data is sampled using a combination of clustering and filtering that ignores domains that are too old (or viewed as long standing, established, and/or not likely to change). These are domains not likely to provide predictive threat analyzers with new information. In one configuration, the sampling from clusters is adjusted by the EPSS to enhance opportunities for smaller clusters to be represented in the resultant neutral samples and to prevent clusters that tend to have a high proportion of very similar domains from being over represented (by down sampling). This method prevents a single cluster from dominating the resultant samples and thus potentially skewing results. For example, parked domains and domains that are autogenerated by tools based upon templates (such as using WIX) tend to be very similar to each other and group together in very large clusters. In some EPSS configurations, it may be preferable to limit the effect of such clusters on sampling. In other example EPSS configurations, sampling can occur based upon other rules such as size or category representative clustering. The clustering and filtering can be performed in either order. EPSS models created using the framework overviewed above can incorporate these improved neutral data set sampling to achieve better precision and recall.

FIG. 1 is a block diagram of components of an example Enhanced Predictive Security System described herein. In one example embodiment, the Enhanced Predictive Security System comprises one or more functional components/modules that work together to provide an architecture and a framework for building and deploying cybersecurity threat analysis application. For example, the EPSS 100 may comprise one or more machine learning algorithms 110, feature class engines (for use with feature engineering) 111, tuning systems 112, ensemble classifier engines 113, and validation and testing engines 114. These components cooperate and act upon domain data and feature class vectors (stored in a repository 115), to create sampled test, training, and validation data 116 and to build model subsets and applications using trained model library 117. In an example EPSS configuration, the trained model library 117 stores definitions of each model subset for easy re-instantiation, including an indication of the machine learning algorithm used to create the model along with hyper parameters for tuning the model, and a description of the feature class information used to build an input feature vector associated with the model, an indication of a source for training data, and an indication of training data sampling parameters. Other versions of the model library 117 may contain more or less or different information.

The machine learning algorithms 110 may comprise any type of machine learning algorithm capable of predictive results. For example, the machine learning algorithms incorporated in EPSS 100 may take the form different types of generalized linear models (e.g., linear and logistic regression), kernel based methods (such as Support Vector Machines—SVMs), Bayesian methods (e.g., naïve bayes or Bayesian belief networks), decision trees of all forms (including random forests), neural networks, and deep neural networks. The algorithms 110 may be used to build the model subsets for the "weak classifiers" as well as for the ensemble master classifiers that comprise the ensemble classifier engine 113. In one example EPSS 100, the ensemble classifier engines 113 use logistic regression, a Bayesian classifier, or a decision tree such as a random forest or a gradient boosted tree. The ensemble master classifiers of engine 113 may include different types of voting algorithms such as straight voting, ranking, boosting, or bagging to generate their final scores.

The feature class engines 111 are used to select and transform domain related data stored in repository 115 to actionable feature class vectors used as input into the weak classifiers. Domain related data may include many different types of accumulated or determined data and derived (e.g, combined or EPSS generated) data, including domain names, "whois" protocol information (e.g., administrator and ownership information), IP (internet protocol) addresses, DNS record data, passive DNS activity data, scraped HTML content, TLS (or SSL) certificate information, blocklist designations, and/or other domain related data. This data is collectively referred to herein "internet infrastructure data" or IID. The selection of and transformation of internet infrastructure data into feature class vectors is discussed further in one example EPSS configuration in FIGS. 5 and 6. Other implementations for sampling and transforming (including filtering, encoding, and the like) IID can similarly be incorporated in other EPSS configurations.

Figure 3:
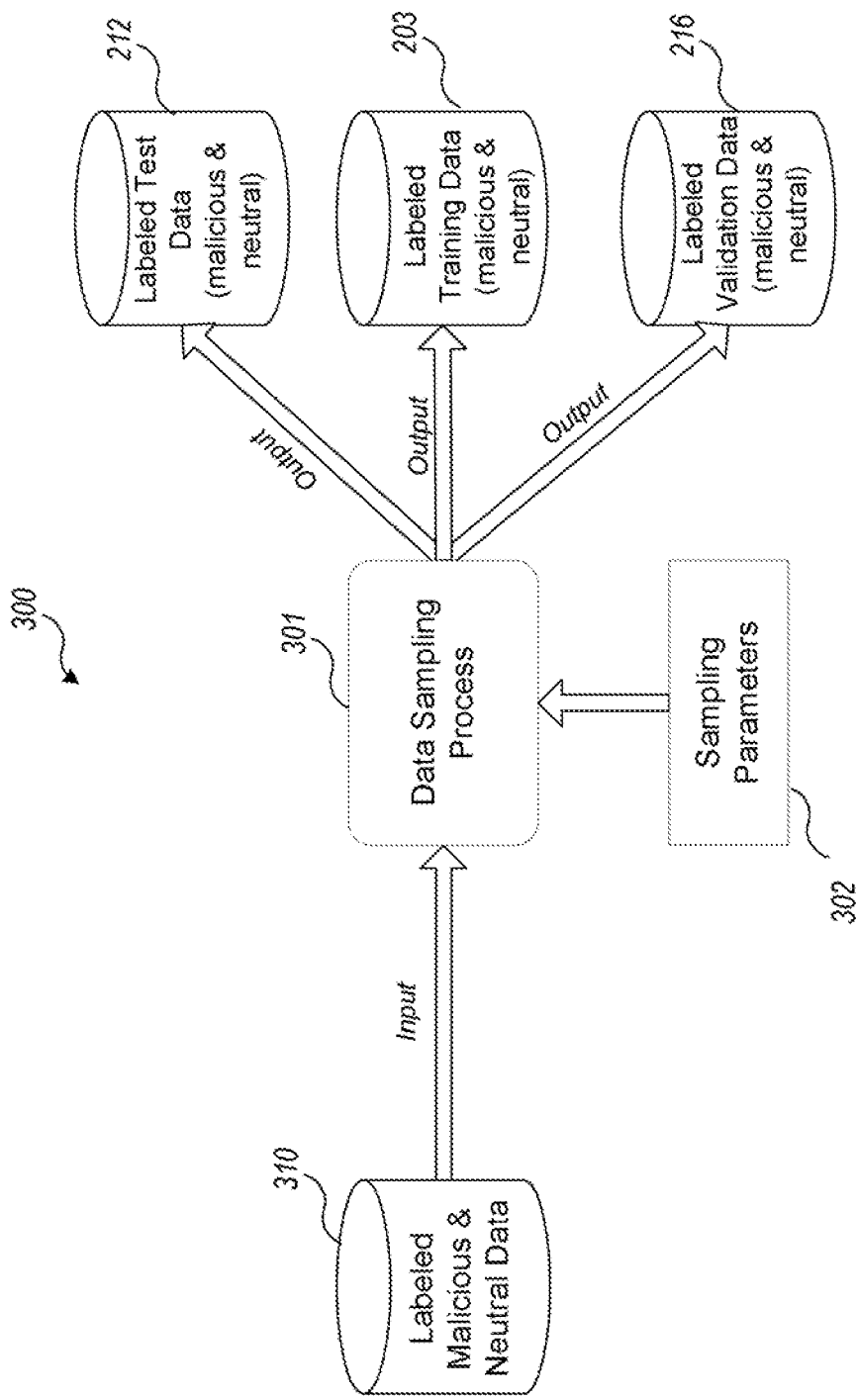
FIG. 3 is a block diagram of an example data sampling pipeline for generating labeled test, training, and validation data from known malicious and neutral data.
Figure 10:
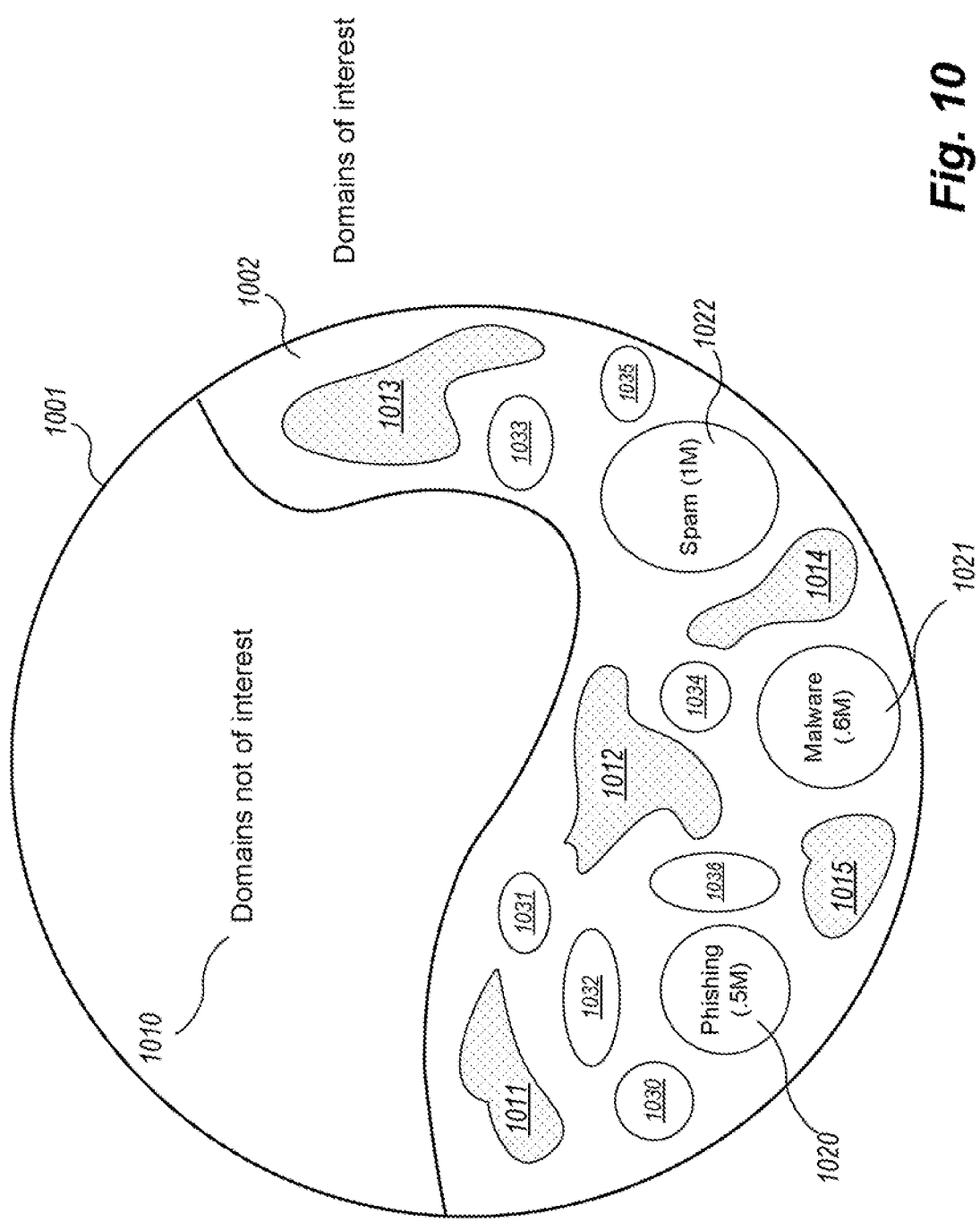
FIG. 10 is a block diagram of the space of domains examined by the example Enhanced Predictive Security System to generate improved neutral data sets.
Figure 11:
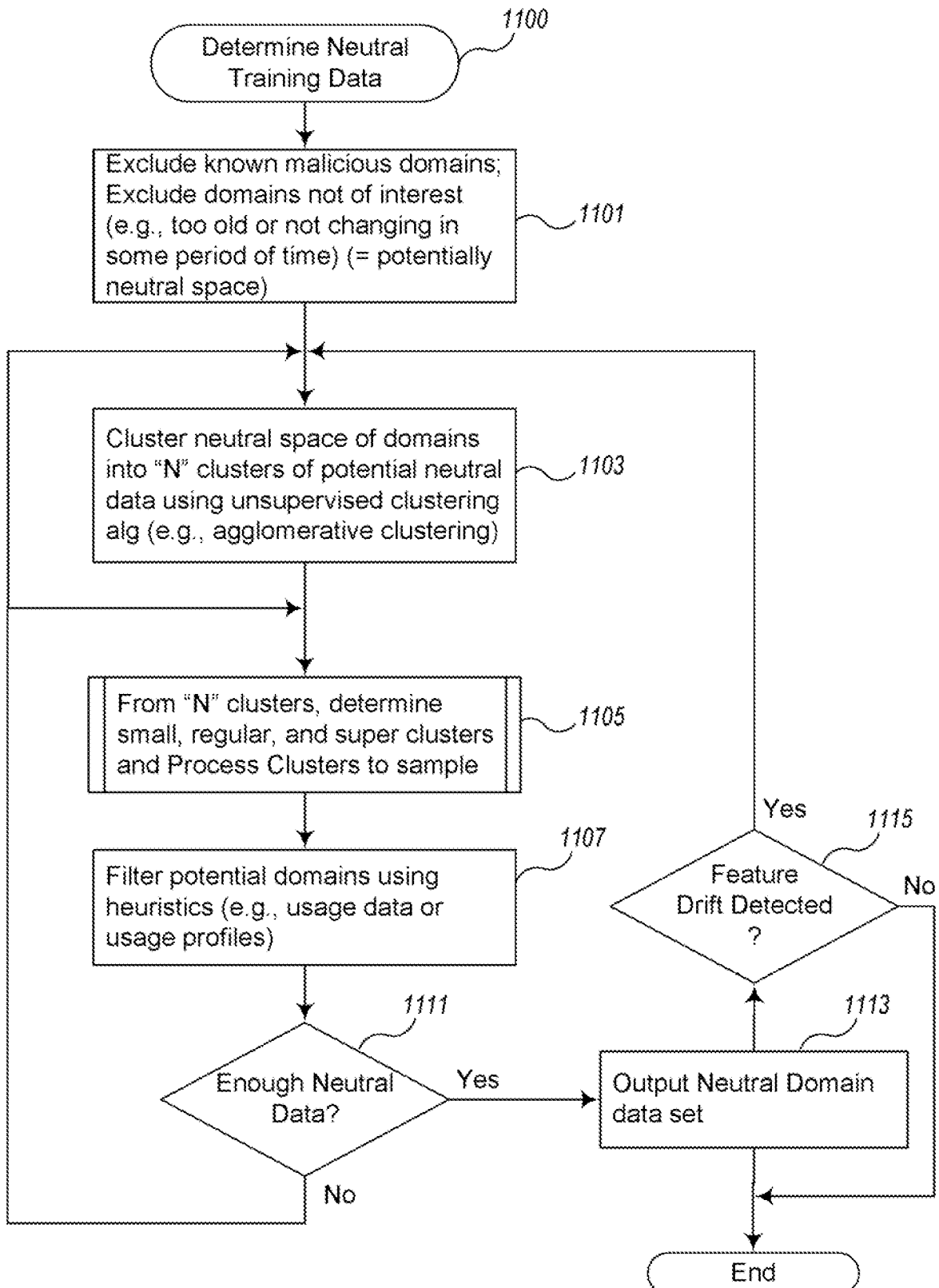
FIG. 11 is a flow diagram of an overall logic flow for determining improved neutral data sets.

The training, testing, and validation engine 114 samples data according to a pipeline described further in FIG. 3 and may incorporate improved neutral data sets as described further in FIGS. 10 and 11.

In some example EPSS 100 configurations, the EPSS 100 is capable of supporting an Application Programming Interface (API) 118 for gaining access to, for example, the data stored in one or more of the repositories 115-117 or to the algorithms and other capabilities encapsulated as part of modules 110-114, depending upon the degree of exposure desired.

Figure 2:
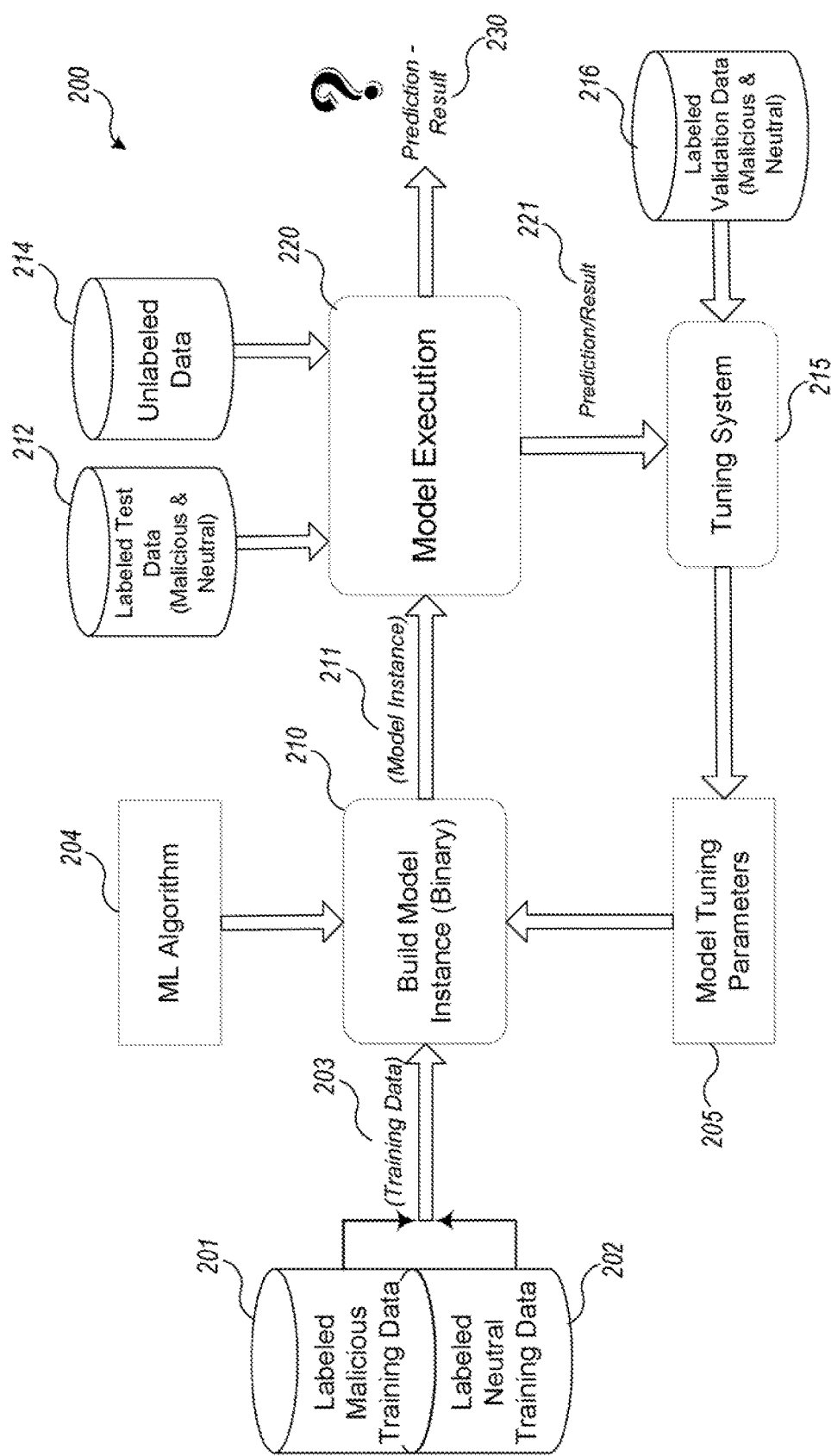
FIG. 2 is a block diagram of an example machine learning pipeline that can be utilized by an example Enhanced Predictive Security System to build and tune the various cybersecurity threat analysis applications.

FIG. 2 is a block diagram of an example machine learning pipeline that can be utilized by an example Enhanced Predictive Security System to build and tune the various cybersecurity threat analysis applications for predicting malicious domains. Pipeline 200 is a general model for predicting "predictably malicious" domains—and the components of EPSS 100 are integrated using this pipeline to build applications (executable models) 220 used to predict malicious domains. In the case of EPSS 100, the "model" 220 is an application comprising multiple models, including the weak classifiers and ensemble master classifiers, described further in FIG. 8. This same pipeline can be used with existing classifiers and with classifiers enhanced to use the improved neutral data sets described herein to achieve more accurate and consistent predictions.

In FIG. 2, the pipeline 200 illustrates how models are built and tuned for deployment as a cybersecurity threat analysis application in order to put the EPSS build framework into context. Portions of the pipeline 200 are looped and assessed (or reassessed) until the executed model 220 is capable of predicting a result 221 that is considered "acceptable" (e.g., correct according to some determined value, percentage of time, threshold, precision and/or recall statistical requirements, etc.). According to the pipeline 200, labeled (known) malicious data 201 along with labeled (known) neutral data 202 in the form of training data 203 along with model tuning parameters 205 and a certain (e.g., determined, selected, designated, etc.) machine learning algorithm 204 (such as linear regression) are input into a build process 210 to build a trained model instance 211 (a binary). This trained model instance 211 (i.e., trained model) is then run (shown as model execution 220) on labeled malicious and neutral test data 212 to generate a prediction/result 221. The resultant prediction 221 is input along with labeled malicious and neutral validation data 216 into a tuning system 215, which is used to determine the (potentially modified) model tuning parameters 205 to run in the next iteration of the pipeline (rebuilding the model instance 210 and executing the trained and tuned model 220) until the trained model 220 predicts an outcome (result) that is correct sufficient times and with sufficient accuracy to be considered acceptable (the validation data is used to validate the prediction of the test data as malicious or not). The data used as training, test, or validation data can be sampled as described according to FIG. 3. This loop continues until a prediction/result 221 is generated that is considered within acceptable characteristics as described above. When an acceptable trained model state is achieved, trained model instance 211 can be deployed in an application (model execution 220) with new (unlabeled data) domain data 214 to generate a prediction/result 230. This prediction/result 230 can then be forwarded and/or used in any appropriate manner such as to inform end users of a predictably malicious domain, to rank domains as malicious, or the like.

Depending upon the machine learning environment, some portions of this pipeline may be facilitated by human interaction. In the EPSS configurations described herein, the framework for building and tuning new models facilitates and makes more repeatable and efficient the generation of acceptable models 220. Some portions of this process can be automated using this framework such as trying a series of different tuning parameters using autogenerated models created from metadata stored in the trained model library 117 of FIG. 1.

FIG. 3 is a block diagram of an example data sampling pipeline for generating labeled test, training, and validation data from known malicious and neutral data. In FIG. 3, labeled (known) malicious and neutral data 310 is input into data sampling process, which is tuned using sampling parameters 302, to generate different types of sampled data, including labeled test data 212, labeled training data 203, and labeled validation data 216. This labeled data can then be incorporated into a machine learning pipeline such as machine learning pipeline 200. The data sampling pipeline 300 can be used with existing classifiers as well as with an example EPSS to generate the labeled data used in the example machine learning pipeline 200 described with reference to FIG. 2. Additionally, the techniques for using improved labeled neutral data as described with reference to FIGS. 10 and 11 can be incorporated into pipeline 300 to generate improved labeled malicious and neutral data 310, input into the sampling process 301.

Example embodiments described herein provide applications, tools, data structures and other support to implement an Enhanced Predictive Security System to be used to predict "predictably malicious" domains. The described techniques, methods, and components may be used for other purposes, including for predicting other security incidences. The techniques, methods, and components of Enhanced Predictive Security System are generally applicable to any type of cybersecurity threat system or framework. Also, although the examples described herein often refer to a domain centric cybersecurity threat analysis, the techniques described herein can also be used in other cybersecurity threat environments and application. Also, although certain terms are used primarily herein, other terms could be used interchangeably to yield equivalent embodiments and examples. In addition, terms may have alternate spellings which may or may not be explicitly mentioned, and all such variations of terms are intended to be included.

In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 4:
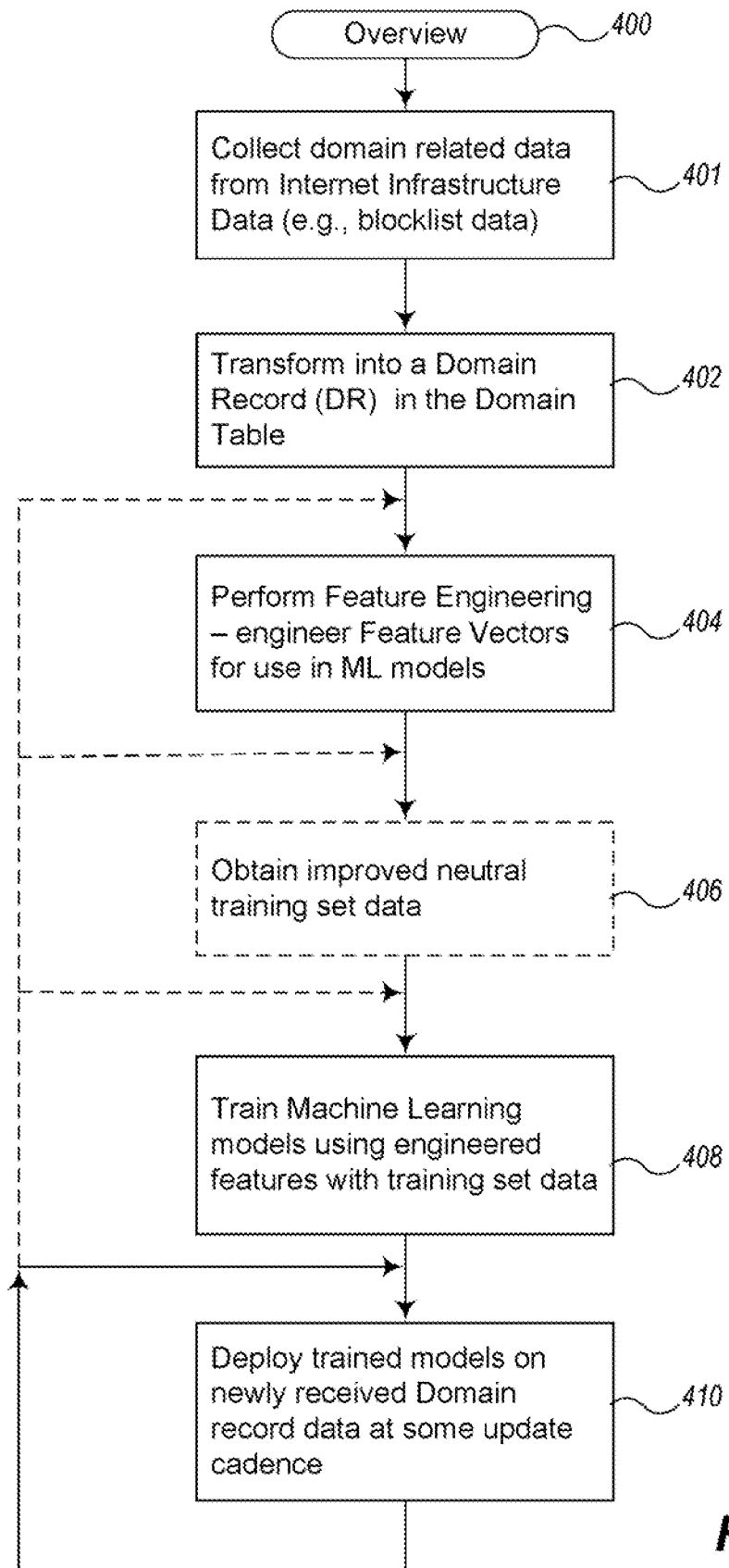
FIG. 4 is a flow diagram of an overall flow of an example Enhanced Predictive Security System.

FIG. 4 is a flow diagram of an overall flow of an example Enhanced Predictive Security System. The logic described in FIG. 4 describes use of the EPSS framework to generate and/or tune predictive cybersecurity threat analysis applications for deployment. Portions of this logic may be optional in some predictive security systems and different logic may be executed in a loop to tune applications once deployed.

In block 401, the system collects domain related data from Internet Infrastructure Data (IID), both gathered and derived, including for example, domain names, "whois" protocol information (e.g., administrator and ownership information), IP (internet protocol) addresses, DNS record data, passive DNS activity data, scraped HTML content, TLS certificate information, and/or other domain related data. This data may be collected from a variety of sources and at different cadences and may be generated by the EPSS itself. For example, blocklist data which indicates known malicious domains, are available from a variety of services which update typically at least daily. For example, such data is available from organizations or companies such as The Spamhaus Project, an international organization that delivers lists of blocked IP addresses and blocked domains as soon as they are researched and added to their threat lists. Other private companies and other organizations provide similar data or subsets of such data. Other types of IID may be updated once a day or less frequently, for example some are streamed in near real-time, others are forwarded weekly, bi-weekly, monthly, etc. For example, public DNS ("A" record) data are available to all DNS servers participating in internet traffic, as they are the "directory" entries that map top-level logical names (such as "domaintools.com") to IP addresses. Passive DNS activity data are packets that indicate that at some point in time a domain has been associated with a specific DNS record. This data is collected and distributed, for example, by a service such as a hosting company or other Internet Service Provider (ISP), which inserts a "probe" to detect such packets. Businesses that host their own DNS servers also can insert such probes and collect data similarly. Whois data is maintained by a distributed registry that stores information from ISP and other hosting services when a domain is registered. This data is typically obtained by using third party aggregator services that accumulate registration data from various registrars according to ICANN ("icann.org") agreements, a non-profit organization responsible for administering IP addresses. For example, whois data may comprise attributes such as domain name, domain status, updated date, creation date, expiration date, registrar name/ID, registrant data (e.g., name, organization, address info, contact info, etc.), DNS security extensions indicator, and/or other information. Other information such as BGP (Border Gateway Protocol information), SSH keys, blockchain information, and the like may also be obtained and used to characterize domain data. Other IID may be made accessible or distributed similarly or in other manners, for example, by scraping HTML data from web pages using known or proprietary HTML content (web page) scraping tools, by accessing TLS certificate information, etc.

The data obtained in block 401 can be used to glean a lot of different information that is known about domains, such as names associated, registrars, physical addresses, internet addresses, activity, owners, location of servers and the like. In addition to gathered data, the EPSS may also derive data (not shown) that may represent particular combinations of other data for use, for example, in feature engineering. All of this information can be used as a kind of IID "profile" of any particular domain. Once a domain is classified as "malicious" using blocklists or as a result of running the predictive threat profilers of the EPSS, then other domains with similar profiles or that resolve to the same domain name, or ones whose characteristics share aspects with known malicious domains, are candidates for being "predictably malicious."

Once data is obtained or determined, then in block 402, any newly collected data or derived for a particular domain is entered into a domain record (DR) in a table that is maintained for use by the EPSS. An example EPSS domain table is described below with reference to FIG. 5. In some EPSS configurations, data from this table can be exported or queried for other purposes including for example made accessible via an API interface or streamed or batch distributed to consumers of such data.

In block 404, feature engineering is performed to engineer feature vectors for use in machine learning models. In overview, a feature vector is used as a way to select (extract, determine, or the like) and encode domain information for input into a machine learning algorithm. For example, a feature vector applied to a type of domain related data stored in the EPSS domain table (such as "domain name"), can be used to encode information about each domain based upon whether the domain matches or doesn't match specific criteria. One such feature vector may indicate whether a domain record has a domain name that includes a number or does not, or the ratio of letters to numbers in the domain name, or other such characteristics. Feature engineering for use with an example EPSS is described further below with reference to FIG. 6.

In block 406, the system optionally incorporates improved neutral domain data for use in training, testing, or validating predictions when using the EPSS framework to build and deploy improved cybersecurity threat analyzers. The process for determining improved neutral domain data is described further with respect to FIGS. 10 and 11.

In block 408, the models built using the engineered features with training set data are trained, tested and validated in accordance with pipeline 200 described above.

Then, in block 410, the trained models are deployed on newly received domain record data at some determined cadence. These models may be used, for example, by end users to predict whether a new domain is "predictably malicious" and/or may be used to update the EPSS domain table with further information. For example, additional information on a currently recorded domain record may be obtained that indicates the status of a current domain when its probability of being malicious changes (for example as a result of executing EPSS trained models), or information on a newly published domain may be entered into the domain table. These trained models may be executed at a particular cadence, for example, once daily, or may be executed upon demand, or when notified of newly acquired domain data, or at other times or frequencies.

As mentioned in block 402, upon collection of new domain related data, the data is transformed into a domain record or, upon collection of changed domain related data or derived domain related data, a corresponding domain record is updated. FIG. 5 is a block diagram of an example domain table built, managed, and used by an example Enhanced Predictive Security System. Domain table 500 comprises one or more domain records, represented by rows 501a-501g, one for each domain whose information has been collected. Columns 501-108 represent a type or category of internet infrastructure data (IID) such as domain name 501; IP address 502; DNS record data or other (geographic) zone data 503; status information such as whether the domain is known malicious (KM) or known neutral (KN) 505; values computed by EPSS predictive threat profilers as to whether the domain is predictably malicious or its classification or "risk" score(s) 506; TLS certificate information 507; whois data 508; hostname data 509; passive DNS (pDNS) activity 510, or any other type of IID. Notably, as described above, each of these columns may represent one or more other columns/values. For example, whois column 508 typically comprises a multitude of different attributes and values as described above. Similarly, TLS data 507 comprises multiple fields/columns such as the name of the issuing certificate authority, alternate domain names, issue date, expiry data, public key, digital signature of the certificate authority, etc. As well, not shown, additional fields may be derived by combining some of the other data present in other fields, for example to yield cross products of other fields. Other such combinations and permutations are possible. Table 500 represents a domain record collection as an abstraction and may be implemented using different types of storage facilities, such as files, databases, or the like, as represented in domain data 115 in FIG. 1. Also, as described elsewhere in this document, rows 501n from domain table 500 may be selected using one or more domain IIDs (columns 501-508) as indexes/keys for generation of sampled data. For example, all domain records with a status of "known malicious" (KM) may be selected for use in sampling labeled malicious data 201 in FIG. 2.

As described in block 404 of FIG. 4, feature engineering is performed by the EPSS to determine what IID characteristics are desirable to be examined to select and encode data for each domain to be used as input to the various machine learning algorithms. Different characteristics may be chosen based upon the particular cybersecurity analysis application desired. For example, characteristics of different IIDs may be examined for a phishing application that are different from those examined for a malware application. Further, these characteristics may change based upon the customer. In addition, some IID characteristics may be selected because they are indicative of domain "activity" and others because they are more descriptive. Thus, it is possible to view feature engineering as giving an EPSS framework the ability to slice and dice the data (the IID values) in different ways for different purposes/applications.

Figure 6:
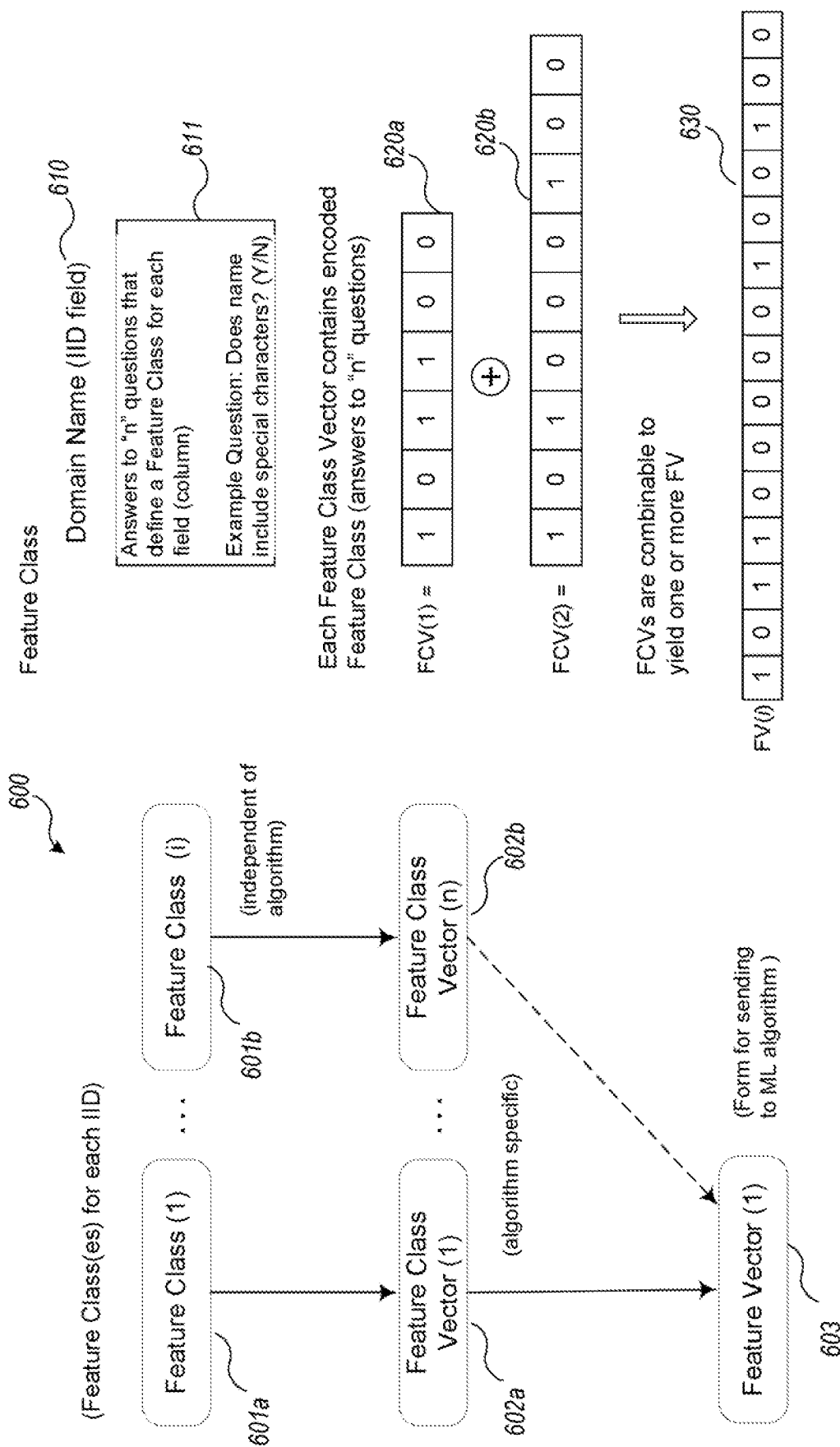
FIG. 6 is a block diagram of data abstractions used by an example Enhanced Predictive Security System for feature engineering.

FIG. 6 is a block diagram of data abstractions used by an example Enhanced Predictive Security System for feature engineering. In one example EPSS configuration, data abstraction hierarchy 600 includes a three level architecture for each IID, which comprises one or more feature classes 601a-601b, one or more feature class vectors 602a-602b, and one or more feature vectors 603. In the abstraction hierarchy shown, feature classes 601 are used to query the IID for specific data regardless of how the answer (extracted data) is encoded, feature class vectors 602 encode the extracted data according to a specific algorithm, and feature vectors 603 aggregate (concatenate, combine, collect, etc.) the feature class vectors 602 of relevance for a particular purpose into a single vector called a feature vector 603. A feature vector, e.g., feature vector 603, is what is fed into a machine learning algorithm as input. In one EPSS configuration, no more than one encoding of a particular feature class (FCV) is included in a resultant feature vector for a given ML algorithm instance and all of the feature class vectors are concatenated to derive the resultant feature vector. (In this example there may be derived feature classes that include different encodings of a feature class also included by itself in the resultant feature vector.) Other EPSS configurations may combine feature class vectors into feature vectors differently.

The left-hand side of FIG. 6 shows these abstractions within abstraction hierarchy 600. The right-hand side of FIG. 6 shows examples of each of these abstractions. For example, for the "domain name" IID field 610 (e.g. IID field 501 of domain table 500 of FIG. 5), feature class (1) 601a might encompass "n" questions 611 (rules, algorithms, logic, etc.) that need to be examined and answered for the domain name data (IID 610) for each domain record of interest. Examples include logic such as: "does the name include special characters? (Y/N);" "what is the ratio of letters to numbers in the name? (a number);" and the like. Some feature classes may have many rules to be executed—others may just have one rule or a few. In example EPSS configurations, these rules may be derived by looking at patterns that occur in known malicious domains. In some configurations, these patterns are facilitated using machine learning techniques even if a human performs the ultimate determination of feature classes. In addition, these patterns may be different for different types of cybersecurity threat analysis—thus, there may be a different feature class even for the same IID for a phishing, spam, or malware application. In addition, there may be a different feature class for a phishing application related to the banking industry versus a phishing application for the project planning software industry.

Continuing this example, when a domain record is examined using feature class (1) 601a, the answers to questions 611 are encoded into one or more feature class vectors, for example, which correspond to needs of particular ML algorithms. For example FCV(1) 620a represents an encoding of feature class (1) 601a that may be appropriate for one ML algorithm. FCV(2) 620b represents an encoding of a different feature class (feature class (i) 601b), corresponding to a different IID. Each feature class vector encodes the answers based upon its particular encoding algorithm. For example, a the number "17" may be encoded as the string "17" or as a 64 bit char value, depending upon the machine learning algorithm and purpose. Similarly, a yes/no answer may be encoded as the string "Y" or "N," the string "Yes" or "No," or the binary bit "1" or "0." Other encodings are similarly possible.

Feature class vectors for different feature classes are then combined into a single feature vector for input to a machine learning algorithm. For example, as shown in FIG. 6, FCV(1) 620a and FCV(2) 620b may be concatenated together to achieve FV(i), feature vector 630. In some configurations, the resultant feature vector 630 is modified such as by dropping the least significant bit, which is beneficial for some ML algorithms. Other combination logic, encodings, and algorithms may be similarly incorporated.

Of note, in some EPSS configurations, feature classes may be directly encoded and combined into feature vectors. Also, in some configurations derived values that represent EPSS classification scores or other output are explicitly not reflected in features classes representing IID information. Similarly, additional levels of abstraction may be added. Also, the number of feature classes and their specification may be determined through experimentation and fine tuning as part of the machine learning pipeline.

Figure 7:
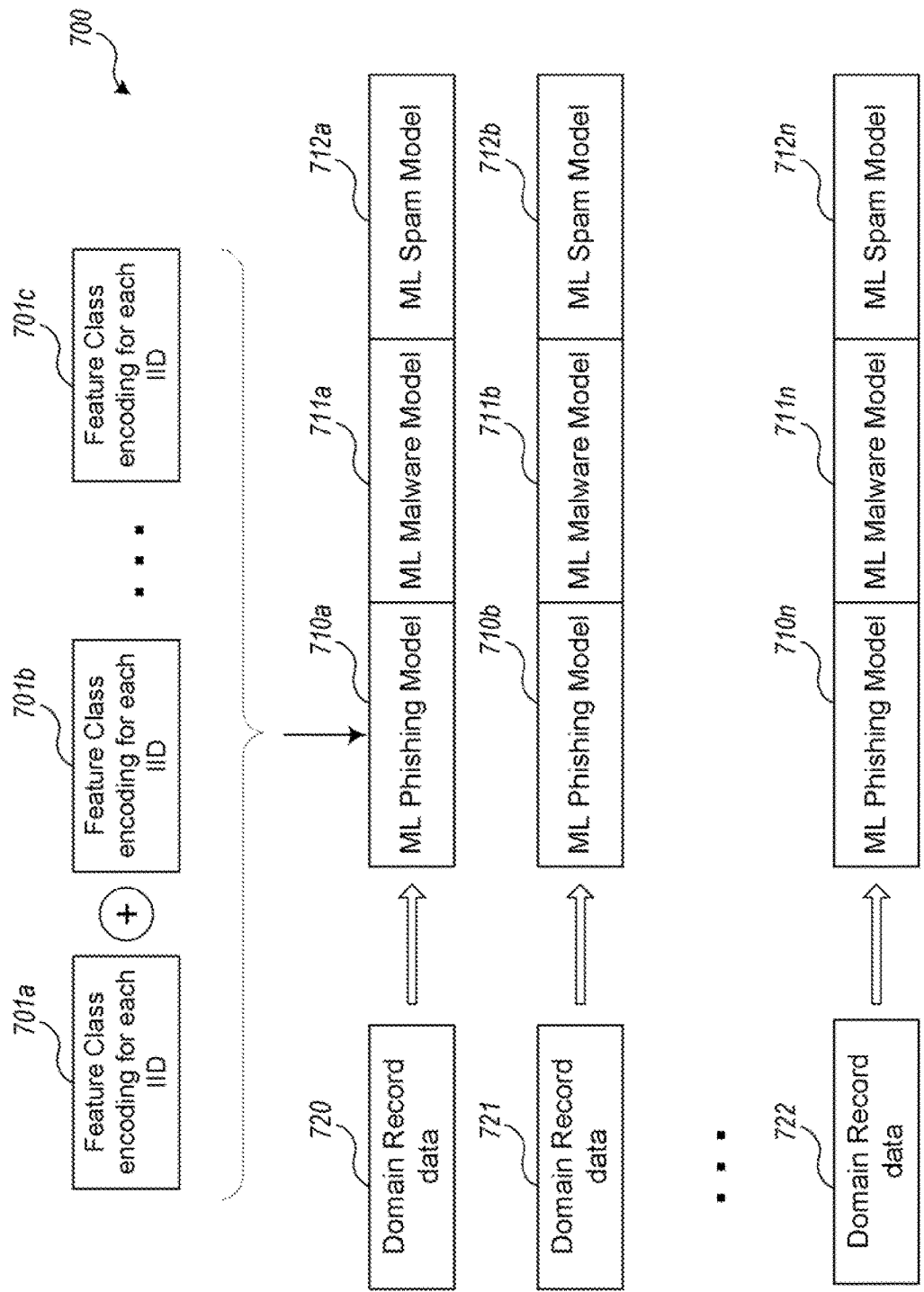
FIG. 7 is a block diagram illustrating a current architecture for building, training and running predictive threat profilers.

FIG. 7 is a block diagram illustrating a current architecture for building, training and running predictive threat profilers. Architecture 700 shows the use of different predictive models (e.g., used as predictive threat profilers) executed on a new incoming domain record data 720-722 to determine whether the domain record data is phishing, malware, or spam. As illustrated, different feature classes 701a-c are combined in the manners described with reference to FIG. 6 into a feature vector which is used to examine an unknown domain record, such as record data 720, 721, or 722. For example, the ML phishing model 710a examines domain record 720 using feature class vector formed from feature classes 701a-c to determine whether the domain that corresponds to domain record data 720 is likely to be a phishing attempt. Similarly, ML malware model 711a examines domain record 720 using feature class vector formed from feature classes 701a-c or other or different feature classes (not shown) to determine whether the domain that corresponds to domain record data 720 is likely to be install malware on a target recipient. Also, ML spam model 712a examines domain record 720 using a feature class vector formed from feature classes 701a-c or other or different feature classes (not shown) to determine whether the domain that corresponds to domain record data 720 is likely to be associated with spam. As seen in FIG. 7, each model stands on its own and examines the unknown domain record data in its own right to predict whether it is malicious.

Figure 8:
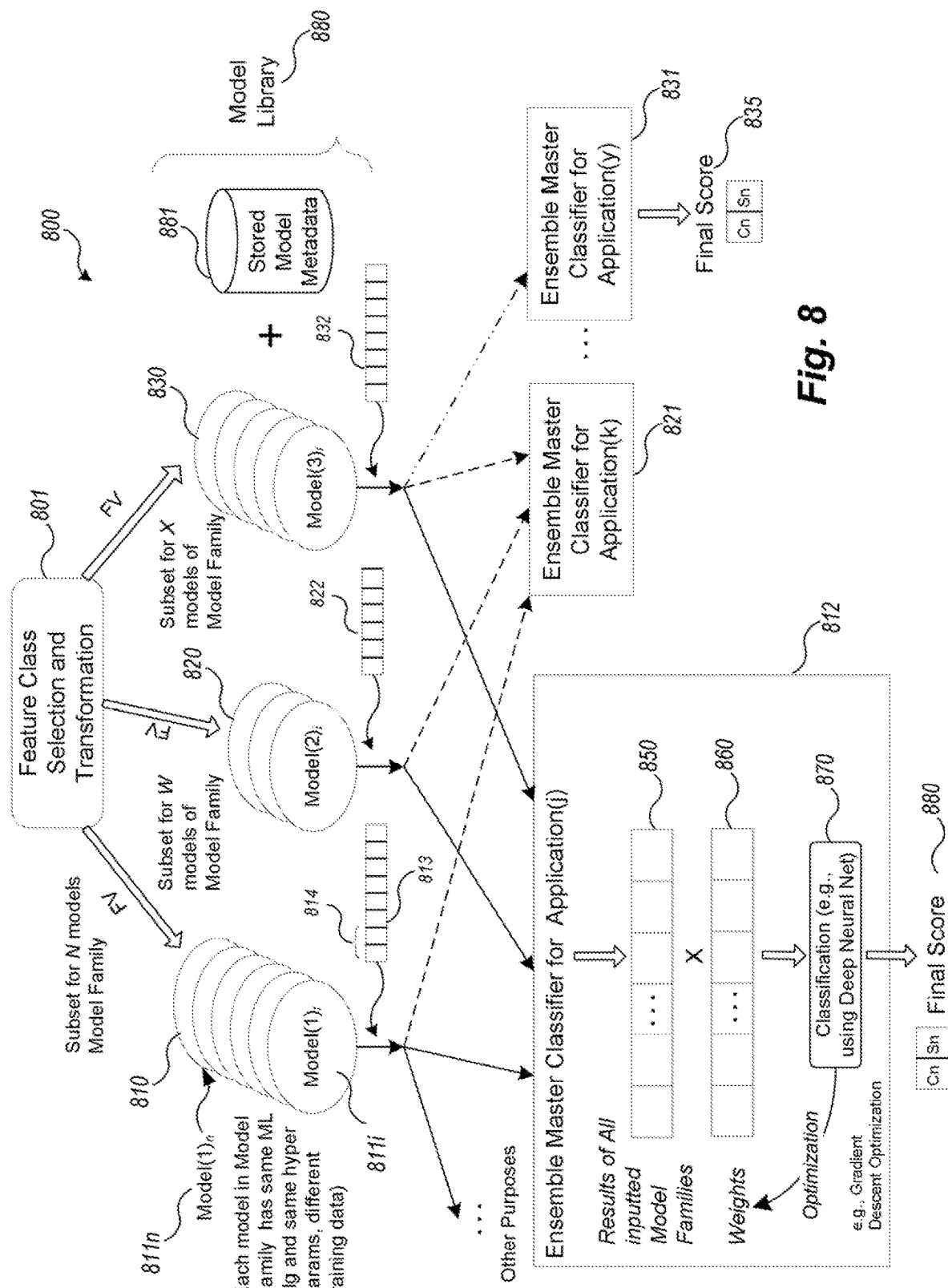
FIG. 8 is a block diagram illustrating an improved architecture for building, training, and running an example Enhanced Predictive Security System.

FIG. 8 is a block diagram illustrating an improved architecture for building, training, and running an example Enhanced Predictive Security System. Architecture 800 takes advantage of reusability and extensibility of model definitions and ensemble classification techniques to achieve more accurate and sustainable predictions by employing a multi-level machine learning architecture. In overview, instead of using a single model as described with respect to the current prediction modeling of FIG. 7, in the improved architecture, each cybersecurity threat analysis application uses multi-level machine learning to achieve greater precision and recall. Specifically, each application comprises one or more collections (subsets) of models, which are trained using different training data but otherwise share the same machine learning algorithm, modeling tuning parameters, and feature vector values, which can be ultimately tuned and optimized for the type of data the model is responsible for classifying. Thus, each model subset acts as a set of "weak classifiers" for a particular type or collection of threat data. A combination of the results of each applicable subset of weak classifiers then is fed as input into an ensemble master classifier, which can be iteratively run with varying weights applied to the weak classifier subset outputs until a determined optimization value (e.g., a threshold, minimum, percentage, probability, etc.) is reached. The resultant ensemble master classifier can then be deployed as a cybersecurity threat analysis application and applied an unknown domain to predict whether the domain is "predictably malicious."

For example, as EPSS architecture 800 illustrates how models for three different applications, Application(j), Application(k), and Application(y) can be built (e.g., developed and instantiated) and deployed. These applications may correspond for example to an application for phishing, spam, or malware, or may comprise the same type of application (e.g., phishing) for different target customer or the like. Each of the ensemble classifiers for these applications, for example classifiers 812, 821, and 831, may be built and deployed using model library 880 and may employ a single level ensemble master classifier (such as classifier 821 for Application(k) and classifier 831 for Application(y)) or may employ a multi-level ensemble master classifier such as for Application(j).

For example, in order to instantiate the model for Application(j), the following activities are performed. First, the appropriate model subsets are either designed and built according to process 801 or selected and instantiated from the model library 880. The process for building new model subsets is described further with respect to FIG. 9. In essence, in order to build and train a new model subset such as subset 810, feature classes are selected from a feature class library and applied to sampled domain data which are then transformed into feature vectors. The feature vector for each of the "i" models 811i in model subset 810 has the same fields (what values of the IIDS are being looked at and encoded) but the actual values that correspond to the sampled training data may differ as these values are data dependent. In addition, each model of the models 811i in subset 810 (for example, model 811n) uses the same machine learning algorithm (such as linear or logistic regression, SVMs, naïve bayes, Bayesian belief networks, decision tress, random forests, neural networks, and the like) and the same hyper parameters for tuning the indicated machine learning algorithm, but uses different training data (separate samples). The model can be built according to pipeline 200 described with reference to FIGS. 2 and 3. As well, the sampling of the data can be performed using the improved neutral data sets as described with reference to FIGS. 10 and 11. Once the subset is built and trained it can be stored in model library 880. Each model subset stored in the library 880 has metadata stored with it so that they model subset can easily be instantiated as needed for other applications. Stored model metadata 881 includes for example, for each new subset model, an indication of a machine learning algorithm, a set of hyper parameters for tuning the indicated machine learning algorithm, a description of feature class information used to build an associated input feature vector, an indication of a source for training data, and an indication of training data sampling parameters and any other metadata needed to recreated the model. In some EPSS configurations, the metadata includes sampling data indicators for testing and validation data and an indicator of whether the model is experimental (or pre-production) versus production and may indicate other values such as versioning indicators. This way it is easy for an automated process to recreate or instantiate another instance of a particular model subset such as model subset 810. Model subsets 820 and 830 are formed similarly.

Once the model subset 810 is built (whether by creation of a new one or instantiating one from the model library) the model output from each of the models 811i (the "weak classifiers") is aggregated into model subset output 813. In the example shown, each model 811i can output two values, which assist in forming the model subset output 813. Typically this score is a value pair (Cn, Sn), where the pair represents a pair of values (Boolean classification or a classification score value, an indicator of existence of a classification score) or a pair of values (likelihood/probability of classification, confidence in the likelihood of classification). In the first case, Cn is a "0" or "1" value or a score (e.g., a value between 0-1) and Sn indicates whether the model was able to make the classification. Thus, a value of (0,1) or (0.1,1) may indicate that something is not malicious or not likely malicious, but a value of (0,0) indicates that no classification was reached. The second case may be used with machine learning algorithms able to issue a probability that something is malicious. In this case, Cn is a probability (model probability) that something is malicious and Sn indicates confidence—which may be used ultimately to indicate "support" for a decision. Notably, for an individual model subset, since only the training data samples vary, if the confidence or support scores vary, it may be an indication that the data has a material effect on the model which may be an indication of usability of the model for production.

One or more model subsets may be used for any particular application. For example, for Application(j), the output 813, 822, and 832 from three different model subsets, namely model subsets 810, 820, and 830 are used to drive the application. In other applications, fewer model subsets may be incorporated. For example, for Application(y), only the model subset output 832 from model subset 830 is used.

The model subset output from each of the model subsets is then configured to be fed into an ensemble master classifier for that particular application so that the predictions can be reduced to a single (final) score. For example, for Application(j), model subset output 813, 822, and 832 are configured as input 850 to the ensemble master classifier 812. In the example shown, the results of each model subset output 813, 822, and 832 are input into input vector 850. Each of these results is then initially weighted by some amount specified in weight vector 860 before being input into the ensemble classification engine 870. The ensemble classification engine 870 may be, for example, a deep neural network or other machine learning algorithm. These initial weights may be formulated using a variety of rules including initially weighting them all the same (flat weighting), weighting the inputs according to their contributions to the input vector 850 or their inverse contributions to the input vector 850, weighting them for example according to the Sn support or confidence values, or some combination of any of the above. Other weighting values may be incorporated. For example, if 6 individual models contribute to model subset 810, 3 contribute to model subset 820, and 5 contribute to model subset 830, then any one model contributes on 1/14 into input vector 850 (if all equal) and the weights chosen according (0.07 each), or each result of model subset 810 could be viewed as contributing 1/6 (0.17) to the input, subset 820 contributing 1/3 (0.33) to the input, and subset 830 contributing 1/5 (0.2) to the input (inverse weighting). Alternatively, based upon the importance of a particular model subset, the weightings (even if Sn values are used) may be skewed as desired. Other weighting combinations appropriate to the application can be similarly incorporated. For example, an initial logistic regression or an initial iteration of classifier 870 may be run on input 850 and the coefficients used as weights vector 860.

Of note, master classifier 812 contains a third layer of machine learning, that is it includes a feedback loop 860-870, which iterates adjusting the weights 860 applied to the model subset outputs' input 850 until the classification result has been optimized, for example, using gradient descent boosting. Gradient descent boosting and other optimization algorithms operate by iterating on (rerunning) the classification 870 varying the weights (vector 860) until the optimization algorithm reaches some optimization or threshold value indicating that the results are not likely to deviate further (by a specified amount) if the classification were continued to rerun.

The output of an optimized ensemble classifier is a final score such as final score 880. This output may be a single score Cn that represents the prediction, for example, in Boolean form or a score between 0 and 1. In other configurations, the final score may comprise a value pair (Cn, Sn), where the value pairs are similar to those described with reference to the model subset outputs above. That is, (Cn, Sn) may indicate a Boolean or classification score and an indicator of whether classification took place, may indicate a probability or a value between 0-99 and a confidence or support for that value, or the like. Similar final scores are output by each ensemble master classifier.

For example, as shown in FIG. 8, a simpler ensemble classifier may be appropriate for the application, such as classifier 831 which may employed simple voting or weighted voting to achieve a final score 835. This may be appropriate for applications such as for a predictive phishing application that generates a score, for example between 1-99, between 0-1, or some other score or range, to determine how likely an unknown domain is to be associated with a phishing attack.

In some configurations, instead of having separate ensemble master classifiers 812, 821, or 831, for each application, the EPSS uses a single "multiclass" ensemble classifier which generates a vector of classifications instead of a single value. In this case for example, there is a single master classifier which can output whether an unlabeled domain is predictably a type of malicious, namely, predictably spam, phishing, or malware.

Once an ensemble master classifier is built, such as classifiers 812, 821, and 831, it can be deployed as described in block 410 of FIG. 4 to output predictably malicious information on domains.

Figure 9:
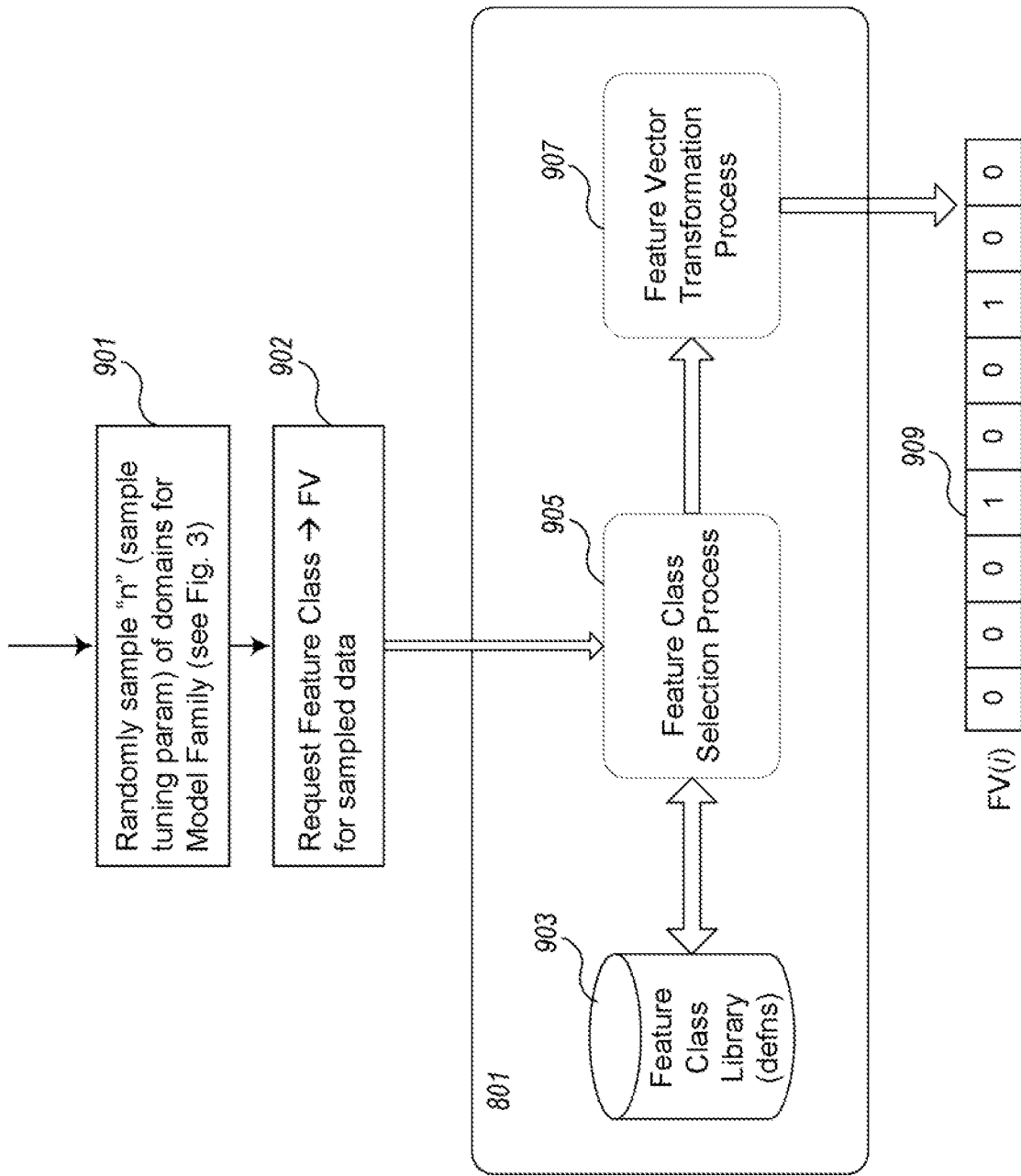
FIG. 9 is a block diagram detailing the process for feature class selection and feature vector transformation used by the example Enhanced Predictive Security System.

FIG. 9 is a block diagram detailing the process for feature class selection and feature vector transformation used by the example Enhanced Predictive Security System. As described above, FIG. 9 illustrates further detail on process 801 for determining feature vectors to be used with the model subsets (the weak classifiers). Accordingly, a set of feature classes is selected 905 either using feature engineering as described with reference to block 404 in FIG. 4, or from a feature class library 903 which contains definitions (and optionally metadata) resulting from such feature engineering—stored for easy reference and access. The selected feature classes are then applied against sampled data (logic 901 and 902) to obtain appropriate values for the sampled data. This data is then (encoded and) transformed into a feature vector 909 for use with a model subset.

FIG. 10 is a block diagram of the space of domains examined by the example Enhanced Predictive Security System to generate improved neutral data sets. These improved neutral data sets may be use to improve training, validation, and test data in for an EPSS configuration pipeline 200 as described with reference to FIG. 2. As of October, 2020, there are about 371 million active domains 1001 present on the internet every day. Of these, approximately 40%, or about 180 million domains, account for domains that are typically of interest 1002 for determining predictably malicious domains. In other security threat applications, all active domains 1001 may be considered of interest. The remaining approximately 60% are domains that are considered "too old" or not likely to be informative 1010. Of the domains of interest 1002, about 1 million ("M") are known spam related 1022, about .6M are known malware related 1021, and about .5M are known phishing related 1020. Thus, of the domains of interest 1002, about 2.1M are known malicious domains.

The remaining number of domains of interest 1002 (those not yet known to be spam, malware, or phishing related) comprise domains that could possibly be considered for obtaining improved neutral data sets for facilitating creation of improved machine learning threat applications such as provided by an EPSS. For example, if one is using 1M domains for sampling malicious data, then one needs 1M domains for sampling neutral data. The less likely the data to be used for neutral data is malicious, or similar to each other the better the neutral data samples. Thus, if 60% of all domains are similar to each other (cluster densely together) and random sampling is employed instead the procedure detailed here, then it is likely that 60% of the supposed neutral data sets is skewed to look like each other (less representative of the entirety of neutral data). Accordingly, the ability of the EPSS process for determining neutral data sets is improved by under sampling certain groups of domains and boosting sampling or insuring sampling from under represented domain groups thereby providing less skewed results.

FIG. 11 is a flow diagram of an overall logic flow for determining improved neutral data sets. These improved neutral data sets may be used to generate improved neutral training, validation, or testing data sets. In overview of the logic 1100, neutral data is sampled using a combination of clustering and filtering that ignores domains that are not of interest (e.g., too old), down samples very large groups of domains that might skew results, and boost samples from domains that may be underrepresented. This tends to prevent a single cluster from dominating the neutral data and thus potentially skewing results. In one configuration, stratified clustering is used which results in clusters representative of their dominance in the world of all domains of interest 1002, yet flat sampling is used so each cluster has equal representation. In other example EPSS configurations, sampling can occur based upon other rules such as size or category representative clustering. The clustering and filtering can be performed in either order.

Specifically, in logic block 1101, the process excludes known malicious domains (domains 1020-1022) and domains not of interest (domains 1010). The resulting domains are then considered domain cluster input, or the potentially neutral space of domains.

In logic block 1103, the process clusters this neutral space of domains into "N" clusters of potentially neutral data using unsupervised clustering algorithms such k-means or agglomerative clustering. These resultant clusters are represented by domain clusters 1011-1065 (potentially different size clusters). The resulting neutral data clusters thus do not include known malicious domains or data deemed to be less useful (e.g., old domains). The ovals and circles 1030-1065 and non-regular shapes (1011-1015) are representative of different sizes of clusters and different densities. For purposes of this example, the non-regular shapes 1011-1015 represent domain clusters that are of very large size ("super clusters") and could potentially skew neutral data samples. For example, such domains may represent parked domains (domains that are essentially placeholders or landing pages and/or not associated with web services), domains that resemble parked domains or domains that are autogenerated by templates and resemble each other and thus tend to cluster together into very large clusters. Domains can be determined as resembling parked domains when their corresponding domain records have IID values that are deemed (within some threshold) to be similar to known parked domains. This can be determined through a variety of algorithms, for example, some number of IID fields having identical values, particular IID fields having the same value or within some range, and the like.

Logic block 1105-1111 provides a loop for selecting neutral data from these clusters. This loop can be repeated until sufficient (for the application purposes) neutral data is selected. Specifically, in block 1105, the domain clusters 1011-1065 are categorized into as "small," "regular," or "super" clusters depending upon cluster size (e.g., the number of domains in a cluster), the amount of neutral data needed, and the number of clusters generated. The amount of neutral data needed is typically determined at runtime, since the number of blocklisted domains changes frequently. The number of clusters desired is typically a heuristic determined through a process of clustering experimentation, trying to optimize for fewer small and super clusters. In one example EPSS configuration, the number of clusters is analyzed separately (and potentially reevaluated at some time interval) to optimize for a fewer number of small and super clusters. This number is then supplied to logic block 1103 as described above. Then, from each of the "N" clusters generated in block 1103, some number of domains are sampled that result in "y" potentially neutral domains. This sampling is described further below with respect to FIGS. 12A-12B. (Once sampled, feature classes can be applied to selected specific data to examine.) In one configuration, equal representation from each cluster is potentially sampled (a same number) so that each cluster contributes the same amount of samples to the neutral data set unless a cluster is less likely to contribute unique neutral data (such as the super clusters). This potentially prevents results from being skewed in preference of the dominance of particular clusters over others. In other configurations, the sampling is relative to the size of the cluster or even another attribute of the cluster. This can potentially skew results to weight some types of clusters higher (more important for the sampling) than others. Other sampling algorithms and combinations may be similarly incorporated.

In logic block 1107, the "y" potentially neutral domains are filtered using filtering rules or heuristics to generate a neutral domain data set. Filtering for example may be based upon usage data or usage profiles from the corresponding domain record data. For example, using pDNS data as a filter, the process can choose to keep of the "y" domains only those with high volume of activity. Or, for example, the process may use pDNS patterns to eliminate domains with usage patterns similar to those of known malicious domains by comparing the domain table domain record pDNS data of the "neutral" domain being examined to those corresponding to known malicious domains.

In logic block 1111, the process examines whether it has generated sufficient neutral data for the desired use. If not, the process returns to the beginning of the loop in block 1105 to resample the data from the clusters using different sampling parameters. If yes, the process exits the loop and proceeds to block 1113. Of note, the process may return instead to recluster the data (block 1103) before resampling and applying the same or different filters. (As well, the process may return instead to refilter the data (block 1107) using different criteria—not shown.)

In logic block 1113, the process outputs a neutral domain data set, for example for neutral training, testing, or validation data.

Of note, in some configurations, the filtering of logic block 1107 and the clustering of logic block 1103 are interchanged—the filtering occurring before the clustering. In addition, each filter criteria may itself be used as a feature class and applied as the filtering step of block 1107 to select data for sampling. In other configurations, it is also possible to pre-cluster based upon activity related data (such as pDNS data or Border Gateway Protocol data), and then cluster from that data. In yet other configurations, filtering/clustering may be performed separately for activity related data and separately for other types of more static or descriptive IIDs. For example, the process may desire to pay attention to how much activity the domain has generally and the type of activity, as the activity may vary dependent upon geographic location or other such factors. The other IIDs may provide slower changing data patterns that contribute to a canonical description of the domain. In this manner it is possible to filter together or separately based upon usage data and other descriptive data. Other combinations are also possible.

As shown in FIG. 11, in block 1115, at some point the process checks to determine whether "feature drift" has occurred—sufficient to rebuild (recluster, resample, and refilter) the neutral domain clusters. Feature drift may be detected by a cluster cohesion measure to determine how well the clusters hold together (how diverse is each neighborhood). Feature drift may be computed via a cohesion measure relative to the centroid of the cluster. Feature drift may also be computed by running the clustering sequence a number of times and comparing how similar the results align. In any case, there are about 275,000 domains created every day with about 240,000 dropping out daily, resulting in a gain of domains daily. Accordingly, the update cadence for rebuilding the clusters (with or without filtering) may consider a balance between frequency of updated information versus system resources used and delay caused by rebuilding the clusters.

Figure 12A:
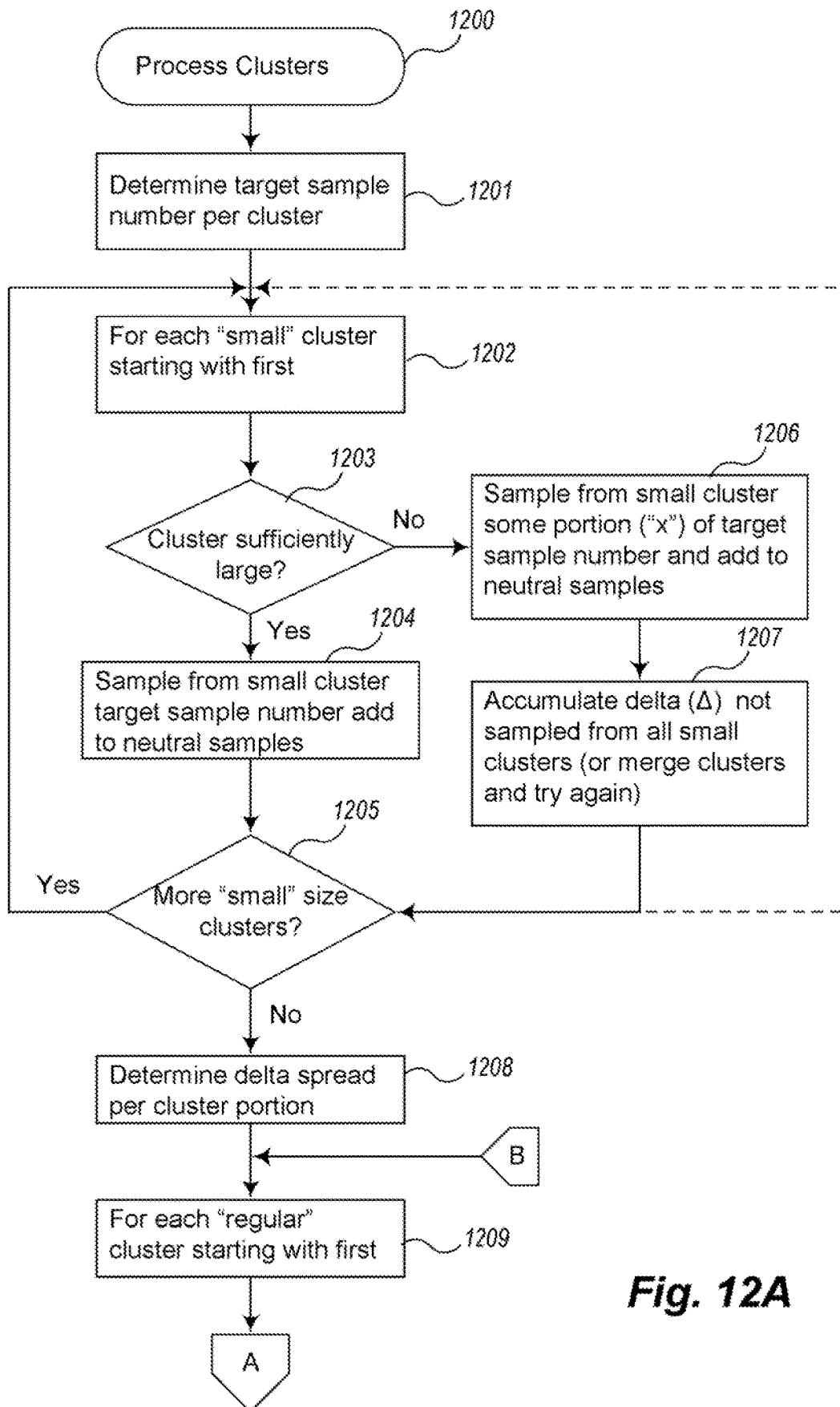
FIGS. 12A-12B are a flow diagram of logic flow of an example process for sampling clusters to generate improved neutral data sets.
Figure 12B:
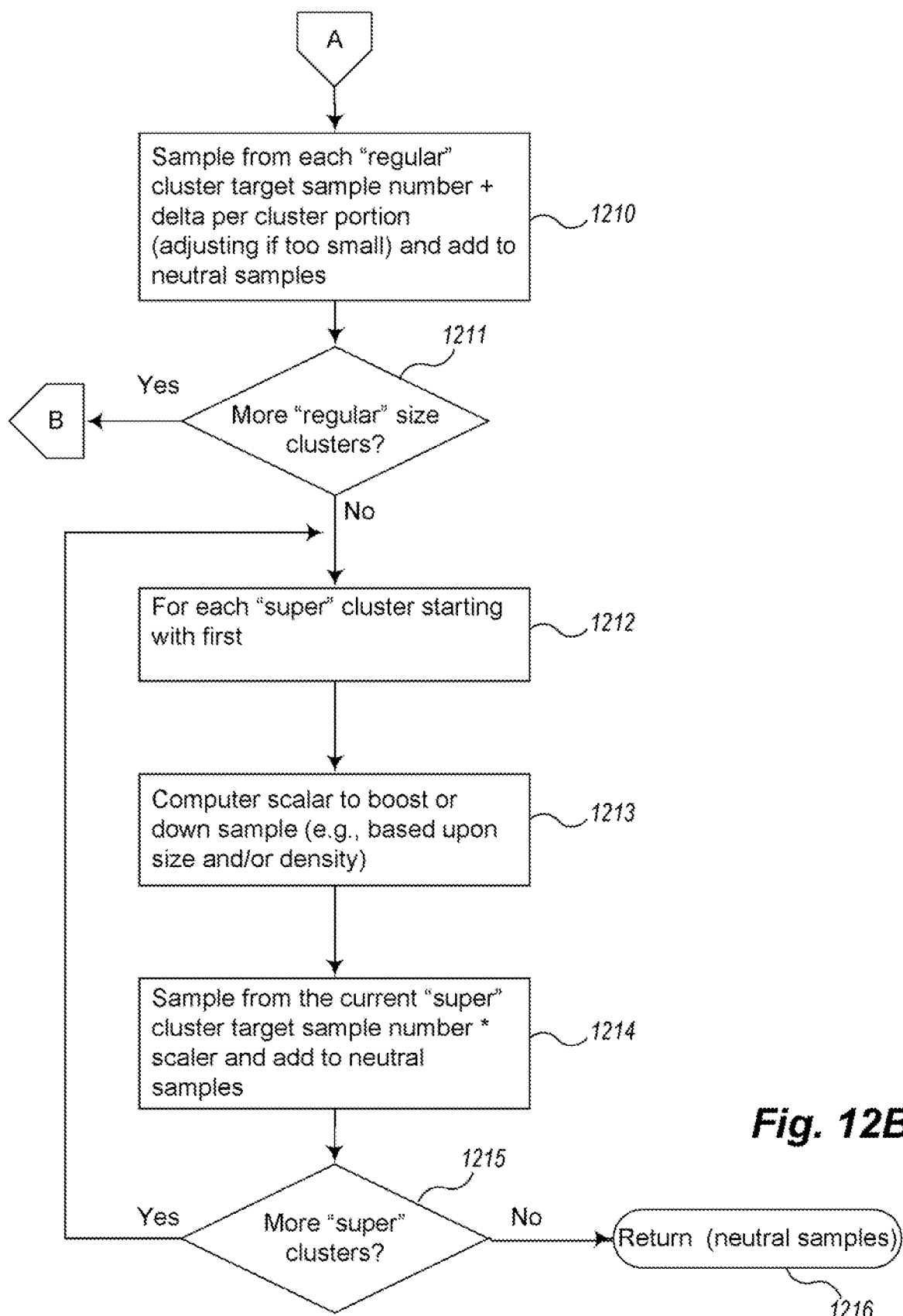

FIGS. 12A and 12B are a flow diagram of logic flow of an example process for sampling clusters to generate improved neutral data sets. The process cluster logic 1200 is executed typically after clustering potentially neutral data (block 1103 of FIG. 11). The overall logic of this particular example EPSS configuration is to determine the desired (target) sample size to select from each cluster making some adjustments for smaller clusters that cannot provide enough samples and for very large ("super") clusters that form groups that potentially skew results. Thus, for these purposes, the "N" clusters are considered in three categories: small, regular, and super clusters. For small clusters, either a smaller number of samples is retrieved from the cluster and the remainder retrieved from "regular" clusters or the smaller clusters may be merged into larger clusters and then sampled. For super clusters, the logic computes a multiplier (a scalar) that can either down size or boost the samples retrieved from that cluster. For example, for super clusters that are dense (tend to resemble each other very closely), the logic down samples to prevent skewing the neutral data towards a dominant domain data type. For super clusters that are sparse, the logic may increase samples to better balance data samples from the super clusters.

The selected clustering algorithm may also offer particular advantages. For example, use of agglomerative clustering results in formation of trees. Clusters can be formed not just from the leaves but as well using intermediate nodes. Tuning parameters can be specified to cause the process to determine when use of an intermediate node may be advisable. For example, in the instance where not enough quality neutral data has been sampled, intermediate nodes may be used to merge smaller clusters into a larger cluster. As well, clustering information may be added to the domain table and the clusters themselves used to tag domains, or as indexes to domains in the domain table.

Specifically, in block 1201, the logic determines the target sample number per cluster based upon the amount of neutral data needed and the number of clusters. For example, if 1 million domains of neutral data are needed and there are 200 clusters, then the target sample number is 5K and the logic attempts to retrieve 5K samples from each of "N" clusters. This is problematic for clusters smaller than the target sample size.

Accordingly, in blocks 1202-1205, the logic loops on each small cluster to extract what it can or merge the cluster to make a larger cluster. Specifically, in block 1202, the logic examines each small cluster starting with the first, and determines in block 1203 whether the cluster is large enough to extract the target number of domain data samples. If yes, the logic continues in block 1204 and samples (e.g., randomly) the target sample number adding an indication of the domain data record to the collection of neutral samples. If no, then the logic continues to block 1206. In block 1206, the logic samples from the small cluster some portion of the target samples desired (say 4K of the 5K desired), adds indicators of the sampled domain data to the collection of neutral samples. Then in block 1207, the logic tracks the difference (accumulates the delta) so that these needed extra samples can be extracted in a distributed manner across the regular (non-small and non-super) clusters. Alternatively, if certain algorithms are employed such as agglomerative clustering, instead of sampling a smaller amount and requiring other clusters to provide extra samples, the logic determines another cluster (such as from an intermediate node of an agglomerative cluster tree) to merge with and returns to the beginning of the loop in block 1202 to attempt sampling again.

Once the small clusters have been processed, if smaller sampling with an accumulated delta has been applied, then the logic proceeds to block 1208 to determine the accumulated delta (how many leftover samples are still needed) from the regular clusters. Then, in blocks 1209-1211, the logic performs a loop on the regular size clusters to provide samples of potentially neutral domain data. Specifically, in block 1209 for each regular cluster starting with the first, in block 1210, the logic samples the target sample number of domains indicated by that cluster, along with the delta number per cluster in order to account for the samples not provided by the small clusters. Then, in block 1211, if there are more regular size clusters to process, the logic returns to block 1209, otherwise continues in block 1212.

In blocks 1212-1215, the logic processes the super clusters to adjust them to prevent skewing. In one configuration, this is performed by examination of both the size and the density of the clusters. For sparse clusters (e.g., those whose members average a further distance from the centroid of the cluster or have a lower cohesion value), the logic may attempt to boost the number of samples retrieved. For dense clusters (e.g., those whose members average a closer distance from the centroid of the cluster or have a higher cohesion value), the logic may attempt to down sample to retrieve less than the target number of samples. These adjustments are made to prevent a single very large cluster with a lot of very similarly structured domains from dominating the neutral data samples. Specifically, in block 1212, for each super cluster starting with the first, the logic computes a scalar to either boost or down sample based upon size and/or density (block 1213). Then, in block 1214, the logic samples from the current super cluster the target number of samples multiplied by the scalar and adds indications of these domains to the collection of neutral samples. In block 1215, if there are more super clusters to process, the logic returns to the beginning of the loop in block 1211. Otherwise, the logic returns the collection of neutral samples.

As mentioned, FIGS. 12A-12B provide an example of one method of adjusting for skew taking into account a desire to represent even very small clusters and to prevent dominance of clusters of domains that tend to all resemble each other. It is to be understood that there are a variety of other sampling techniques and permutations of those described that may be performed to provide sampled neutral data. As well, any method for tracking which domain records are implicated by sampling may be used.

Figure 13:
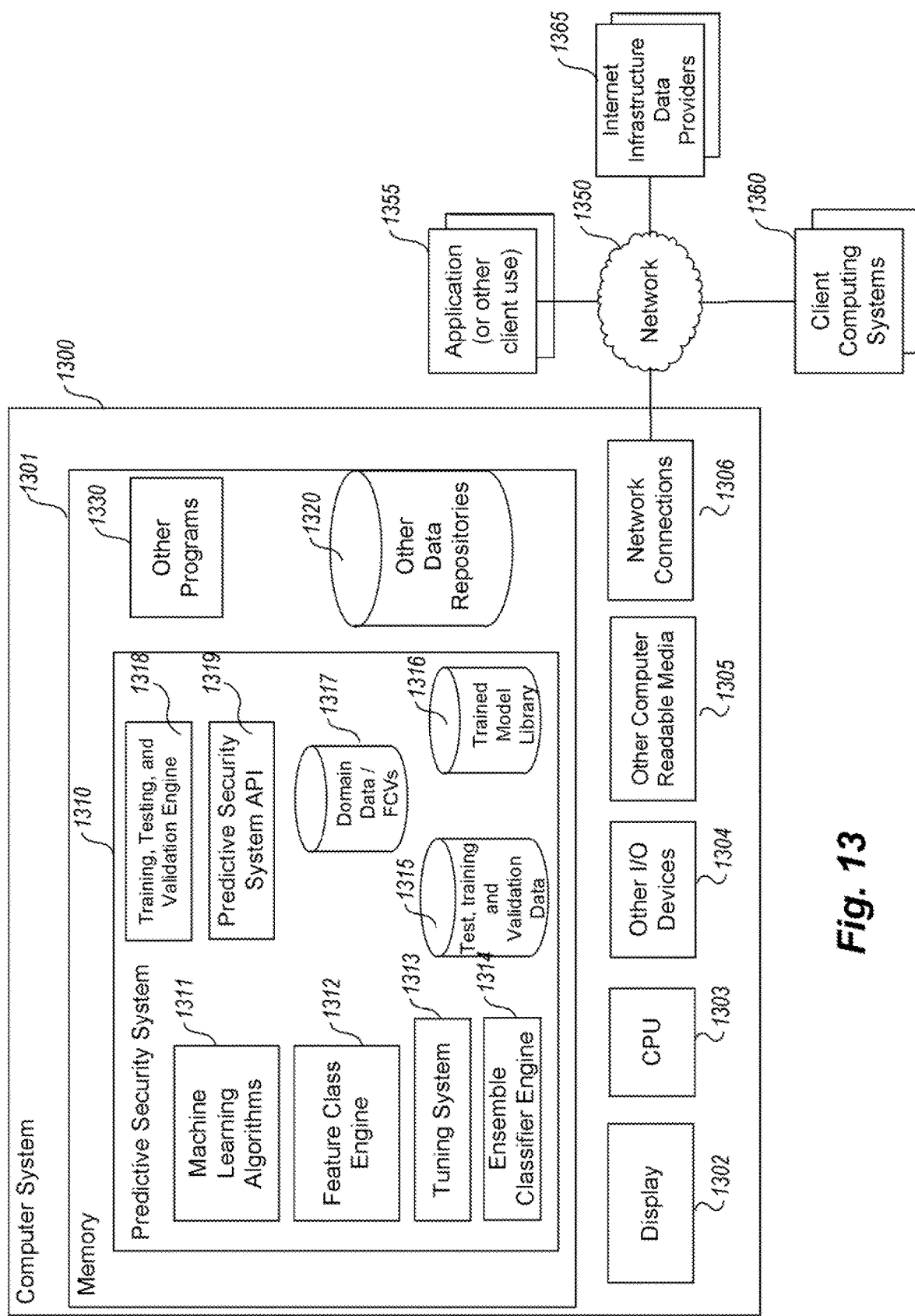
FIG. 13 is a block diagram of an example computing system for practicing embodiments of an example Enhanced Predictive Security System.

FIG. 13 is a block diagram of an example computing system for practicing embodiments of an example Enhanced Predictive Security System. Note that one or more general purpose virtual or physical computing systems suitably instructed or a special purpose computing system may be used to implement an EPSS. Further, the EPSS may be implemented in software, hardware, firmware, or in some combination to achieve the capabilities described herein. Note that one or more general purpose or special purpose computing systems/devices may be used to implement the described techniques. However, just because it is possible to implement the Enhanced Predictive Security System on a general purpose computing system does not mean that the techniques themselves or the operations required to implement the techniques are conventional or well known.

The computing system 1300 may comprise one or more server and/or client computing systems and may span distributed locations. In addition, each block shown may represent one or more such blocks as appropriate to a specific embodiment or may be combined with other blocks. Moreover, the various blocks of the Enhanced Predictive Security System 1310 may physically reside on one or more machines, which use standard (e.g., TCP/IP) or proprietary interprocess communication mechanisms to communicate with each other.

In the embodiment shown, computer system 1300 comprises a computer memory ("memory") 1301, a display 1302, one or more Central Processing Units ("CPU") 1303, Input/Output devices 1304 (e.g., keyboard, mouse, CRT or LCD display, etc.), other computer-readable media 1305, and one or more network connections 1306. The EPSS 1310 is shown residing in memory 1301. In other embodiments, some portion of the contents, some of, or all of the components of the EPSS 1310 may be stored on and/or transmitted over the other computer-readable media 1305. The components of the Enhanced Predictive Security System 1310 preferably execute on one or more CPUs 1303 and manage the building and deployment of predictive cybersecurity threat applications, as described herein. Other code, logic, or programs 1330 and potentially other data repositories, such as data repository 1320, also reside in the memory 1301, and preferably execute on one or more CPUs 1303. Of note, one or more of the components in FIG. 13 may not be present in any specific implementation. For example, some embodiments embedded in other software may not provide means for user input or display.

In a typical embodiment, the EPSS 1310 includes one or more machine learning algorithms 1311, one or more feature class engines 1312, one or more tuning systems 1313, one or more ensemble classifier engines 114, one or more training, testing, and validation engines 1318, one or more domain data and feature class vectors data repository 1317, test, training, and validation data 1315, and model metadata 1316 as described with reference to FIGS. 1-11. In at least some embodiments, the trained model library (model metadata) 1316 is provided external to the EPSS and is available, potentially, over one or more networks 1350. Other and/or different modules may be implemented. In addition, the EPSS may interact via a network 1350 with application or client code 1355 or with or more client computing systems 1360 that use the data, tuning parameters, and models computed and/or built by the enhanced predictive security system 1310 and/or with one or more third-party information provide systems 1365, such as purveyors of the internet infrastructure data used in domain data store 1315. Also, of note, the domain data store 1317 may be provided external to the EPSS as well, for example in a knowledge base or as streamed data accessible over one or more networks 1350.

In an example embodiment, components/modules of the EPSS 1310 are implemented using standard programming techniques. For example, the EPSS 1310 may be implemented as a "native" executable or code segment running on the CPU 103, along with one or more static or dynamic libraries. In other embodiments, the EPSS 1310 may be implemented as instructions processed by a virtual machine. In general, a range of programming languages known in the art may be employed for implementing such example embodiments, including representative implementations of various programming language paradigms, including but not limited to, object-oriented, functional, procedural, scripting, and declarative.

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the EPSS 1310 (e.g., in the data repositories 1315-1317) can be available by standard mechanisms such as through C, C++, C#, and Java APIs; libraries for accessing files, databases, or other data repositories; through scripting languages such as XML; or through Web servers, FTP servers, or other types of servers providing access to stored data. Other components may also be externalized in this manner. The data stores 1315-1317 may be implemented as one or more database systems, file systems, or any other technique for storing such information, or any combination of the above, including implementations using distributed computing techniques.

Also the example EPSS 1310 may be implemented in a distributed environment comprising multiple, even heterogeneous, computer systems and networks. Different configurations and locations of programs and data are contemplated for use with techniques of described herein. In addition, the server and/or client side components may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an EPSS.

Furthermore, in some embodiments, some or all of the components of the EPSS 1310 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of the invention. For example, the techniques, methods, and systems for performing cybersecurity threat prediction analysis and applications discussed herein are applicable to varying architectures differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a computing system for determining neutral domain data for use with machine learning software applications, comprising:
   retrieving and identifying from internet infrastructure data, stored as domain records in a domain table, a potentially neutral subset of domain records that correspond to internet domains that are likely to be neutral domains by:
   excluding all domain records that are known to correspond to malicious domains; and
   excluding all domain records that are older than a determined threshold of interest;
   applying a clustering algorithm to cluster the potentially neutral subset of domain records into a cluster number of potentially neutral clusters of domain records;
   determining, as a neutral domain data output, a sampling number of representative domain records from each potentially neutral cluster of domain records adjusting for size or other characteristics of each potential neutral cluster to balance representation from each cluster;
   filtering the neutral domain data output using a set of neutral sampling heuristics after the clustering algorithm is applied or filtering the potentially neutral subset of domain records before the clustering algorithm is applied;
   repeating the applying the clustering algorithm and the filtering the neutral data output until a determined amount of neutral domain data output is outputted; and
   incorporating the outputted neutral domain data to train, test, validate, or tune a machine learning model configured to make predictions relating to domain information.

2. The method of claim 1, the determining, as a neutral domain data output, a sampling number of representative domain records from each potentially neutral cluster of domain records further comprising:
   determining as a neutral domain data output, a sampling number of representative domain records from each potentially neutral cluster of domain records wherein the same sampling number of representative domain records are determined for each potentially neutral cluster to generate a same number of domain records for each potential neutral cluster.

3. The method of claim 1 wherein determining, as a neutral domain data output, a sampling number of representative domain records from each potentially neutral cluster of domain records is determined based upon at least one of: relative size of each potentially neutral cluster of domain records cluster to the potentially neutral subset of domain records, closeness of one or more domain records in each potentially neutral cluster to the centroid of that potentially neutral cluster, a scaling parameter, or a weighting parameter.

4. The method of claim 3 wherein a scaling parameter is applied to the sampling number to lower the sampling number for each potentially neutral cluster that contains more than a threshold number of domain records and contains highly similar domain records, where similarity is based upon values of some of the internet infrastructure data of the domain records being the same.

5. The method of claim 4 wherein the highly similar domain records are determined at least to be parked domains, to resemble parked domains, or to be domains created using templates.

6. The method of claim 1 wherein the internet infrastructure data comprises data from one or more of domain names, whois information, IP addresses, DNS record data, pDNS activity data, hostname information, on-page HTML content, and TLS or SSL certificates.

7. The method of claim 1 wherein the filtering the neutral domain data output using a set of neutral sampling heuristics after the clustering algorithm is applied or filtering the potentially neutral subset of domain records before the clustering algorithm is applied performs filtering the neutral domain data output using a set of neutral sampling heuristics after the clustering algorithm is applied.

8. The method of claim 1 wherein the filtering the neutral domain data output using a set of neutral sampling heuristics after the clustering algorithm is applied or filtering the potentially neutral subset of domain records before the clustering algorithm is applied performs filtering the potentially neutral subset of domain records before the clustering algorithm is applied.

9. The method of claim 1 wherein the incorporating the outputted neutral domain data includes sampling the outputted neutral data and the domain records that correspond to known malicious data, according to a sampling process, to generate labeled test, training, or validation data that includes domain records that correspond to known malicious domains and domain records that correspond to neutral domains; and wherein the labeled data is inputted to a machine learning model configured to make predictions relating to domain information.

10. The method of claim 9 wherein the generated labeled test, training, or validation data include an equal number or a predetermined ratio of domain records that correspond to known malicious domains and domain records that correspond to neutral domains.

11. The method of claim 1 wherein the machine learning model is at least one of a support vector machine, linear regression classifier, logistic regression classifier, Bayesian classifier, decision tree, random forest, gradient boosted tree, or neural network.

12. The method of claim 1 wherein the domain records that correspond to known malicious domains including domains associated with phishing, spam, or malware.

13. The method of claim 1 wherein the predictions relating to domain information include determining in near real time whether a received indicator of a domain classifies as phishing, spam, or malware.

14. The method of claim 1 wherein the clustering algorithm uses a hierarchical clustering algorithm.

15. The method of claim 1 wherein the clustering algorithm uses k-means clustering to create initial clusters.

16. The method of claim 1 wherein the clustering potentially neutral subset of domain records into a cluster number of potentially neutral clusters of domain records is performed at least daily, on a determined schedule, or on demand.

17. The method of claim 16 wherein the determining, as a neutral domain data output, a sampling number of representative domain records from each potentially neutral cluster of domain records samples representative domain records from both the first number of potentially neutral clusters and the second number of potentially neutral clusters.

18. The method of claim 16 wherein the applying a clustering algorithm to separately cluster activity data of the potentially neutral subset of domain records into a first number of potentially neutral clusters of domain records provides neutral data relating to different geographies to enable the machine learning model to incorporate data from the different geographies.

19. The method of claim 1, further comprising:
determining whether clustering is producing a determined amount of drift using a cluster cohesion measure;
when it is determined that the threshold amount of drift is present, again performing clustering of the potentially neutral subset of domain records into a cluster number of potentially neutral clusters of domain records.

20. The method of claim 1 wherein the applying a clustering algorithm to cluster the potentially neutral subset of domain records into a cluster number of potentially neutral clusters of domain records further comprises:
applying a clustering algorithm to separately cluster activity data of the potentially neutral subset of domain records into a first number of potentially neutral clusters of domain records; and
applying a clustering algorithm to separately cluster descriptive data of the potentially neutral subset of domain records into a second number of potentially neutral clusters of domain records.

21. A computing system configured to automatically produce neutral domain data, comprising:
a data repository data structure storing a domain table comprising domain records, each domain record including internet infrastructure data;
neutral domain data sampling logic configured, when executed, to:
retrieve and identify from the stored domain records a potentially neutral subset of domain records that correspond to internet domains that are likely to be neutral domains by:
excluding all domain records that are known to correspond to malicious domains; and
excluding all domain records that are older than a determined threshold of interest;
apply a clustering algorithm to cluster the potentially neutral subset of domain records into a cluster number of potentially neutral clusters of domain records;
determine, as a neutral domain data output, a sampling number of representative domain records from each potentially neutral cluster of domain records adjusting for size or other characteristics of each potential neutral cluster to balance representation from each cluster;
filter the neutral domain data output using a set of neutral sampling heuristics after the clustering algorithm is applied or filter the potentially neutral subset of domain records before the clustering algorithm is applied; and
repeat the applying the clustering algorithm and the filtering the neutral data output until a determined amount of neutral domain data output is outputted; and
a machine learning training, testing, and validation engine configured to incorporate the outputted neutral domain data to train, test, validate, or tune a machine learning model structured to make predictions relating to domain information.

22. A computer-readable memory medium containing instructions for controlling a computer processor, when executed, to automatically produce neutral domain data that is incorporated in a machine learning model by performing a method comprising:
retrieving and identifying from internet infrastructure data, stored as domain records in a domain table, a potentially neutral subset of domain records that correspond to internet domains that are likely to be neutral domains by:
excluding all domain records that are known to correspond to malicious domains; and
excluding all domain records that are older than a determined threshold of interest;
applying a clustering algorithm to cluster the potentially neutral subset of domain records into a cluster number of potentially neutral clusters of domain records;

determining, as a neutral domain data output, a sampling number of representative domain records from each potentially neutral cluster of domain records adjusting for size or other characteristics of each potential neutral cluster to balance representation from each cluster;

filtering the neutral domain data output using a set of neutral sampling heuristics after the clustering algorithm is applied or filtering the potentially neutral subset of domain records before the clustering algorithm is applied;

repeating the applying the clustering algorithm and the filtering the neutral data output until a determined amount of neutral domain data output is outputted; and incorporating the outputted neutral domain data to train, test, validate, or tune a machine learning model configured to make predictions relating to domain information.

* * * * *